US012069658B2

(12) United States Patent
Takano

(10) Patent No.: US 12,069,658 B2
(45) Date of Patent: Aug. 20, 2024

(54) COMMUNICATION DEVICE, BASE STATION DEVICE, COMMUNICATION METHOD, AND BASE STATION DEVICE CONTROL METHOD

(71) Applicant: Sony Group Corporation, Tokyo (JP)

(72) Inventor: Hiroaki Takano, Tokyo (JP)

(73) Assignee: SONY GROUP CORPORATION, Tokyo (JP)

(*) Notice: Subject to any disclaimer, the term of this patent is extended or adjusted under 35 U.S.C. 154(b) by 395 days.

(21) Appl. No.: 17/436,080

(22) PCT Filed: Mar. 19, 2020

(86) PCT No.: PCT/JP2020/012333
§ 371 (c)(1),
(2) Date: Sep. 3, 2021

(87) PCT Pub. No.: WO2020/196279
PCT Pub. Date: Oct. 1, 2020

(65) Prior Publication Data
US 2022/0174704 A1    Jun. 2, 2022

(30) Foreign Application Priority Data
Mar. 28, 2019  (JP) .................. 2019-065151

(51) Int. Cl.
H04W 72/1273    (2023.01)
H04W 72/02      (2009.01)

(52) U.S. Cl.
CPC ....... H04W 72/1273 (2013.01); H04W 72/02 (2013.01)

(58) Field of Classification Search
CPC . H04W 72/02; H04W 72/1273; H04W 88/02; H04B 7/088
See application file for complete search history.

(56) References Cited

U.S. PATENT DOCUMENTS

2007/0069953 A1   3/2007  Ling
2018/0323848 A1  11/2018  Mizusawa
(Continued)

FOREIGN PATENT DOCUMENTS

CN        1142165 A    2/1997
CN      106416346 A    2/2017
(Continued)

OTHER PUBLICATIONS

Interdigital et al: "Remaining issues on beam management", 3GPP draft R1-1802620, vol. RAN WG1, No. Athens, Greece; Feb. 17, 2018, XP051398058.
(Continued)

Primary Examiner — Kashif Siddiqui
(74) Attorney, Agent, or Firm — XSENSUS LLP

(57) ABSTRACT

A communication device (200) includes a determination unit (241) and a selection unit (242). The determination unit (241) determines a plurality of time offset values for determining a combination of a receiving antenna panel and a receiving beam for user data scheduled by control information transmitted from a base station (100). The selection unit (242) selects a time offset value for determining the combination of the receiving antenna panel and the receiving beam for the user data from among the plurality of time offset values based on the control information received from the base station (100).

10 Claims, 19 Drawing Sheets

(56) References Cited

U.S. PATENT DOCUMENTS

| | | | |
|---|---|---|---|
| 2020/0187128 A1* | 6/2020 | Yao | H04W 52/242 |
| 2021/0083748 A1* | 3/2021 | Guan | H04L 5/0091 |
| 2022/0053546 A1* | 2/2022 | Shi | H04B 7/0408 |

FOREIGN PATENT DOCUMENTS

| | | |
|---|---|---|
| CN | 108112074 A | 6/2018 |
| CN | 108400853 A | 8/2018 |
| CN | 109151969 A | 1/2019 |
| WO | WO-2017192889 A1 | 11/2017 |
| WO | WO-2018123326 A1 | 7/2018 |

OTHER PUBLICATIONS

Samsung: "Enhancements on MIMO for NR", 3GPP draft RP-190149 SR FOR RAN_83_NR-EMIMO, vol. TSG RAN, No. Shenzhen, China; Mar. 11, 2019, XP051689988.

Samsung: "On Beam Management, Measurement and Reporting", 3GPP draft R1-1720290_V1, Nov. 17, 2017, pp. 1-15, XP051368939.

International Search Report and Written Opinion mailed on Jun. 16, 2020, received for PCT Application PCT/JP2020/012333, Filed on Mar. 19, 2020, 6 pages including English Translation.

3GPP, "NR; Physical Layer Procedures for Data (Release 15)", 3GPP TS 38.214 V15.2.0, Jun. 2018, pp. 1-95.

ZTE, "Enhancement on Multi-TRP/Panel Transmission", 3GPP TSG RAN WG1 #96, R1-1901634, Feb. 25-Mar. 1, 2019, pp. 1-19.

Sony, "Considerations on Multi-TRP/Panel Transmission", 3GPP TSG RAN WG1 Meeting #96, R1-1902183, Feb. 25-Mar. 1, 2019, 5 pages.

Sony, "Considerations on Multi-TRP/Panel Transmission", 3GPP TSG RAN WG1 Meeting #98bis, R1-1910749, Oct. 14-20, 2019, 7 pages.

Intel Corporation , "On multi-TRP multi-panel transmission" , 3GPP TSG RAN WG1 adhoc_NR_AH_1901 R1-1901275, Jan. 14, 2019.

Nokia, Nokia Shanghai Bell , Enhancements on Multi-TRP Panel Transmission 3GPP TSG RAN WG1 96 R1-1902563,Feb. 16, 2019.

Huawei, "WF on remaining issues on PTRS for CP-OFDM—Part 2", R1-1711895, 3GPP tsg_ran WWG1_RL1,TSGR1_AH, Jun. 29, 2017, 5 pgs.

\* cited by examiner

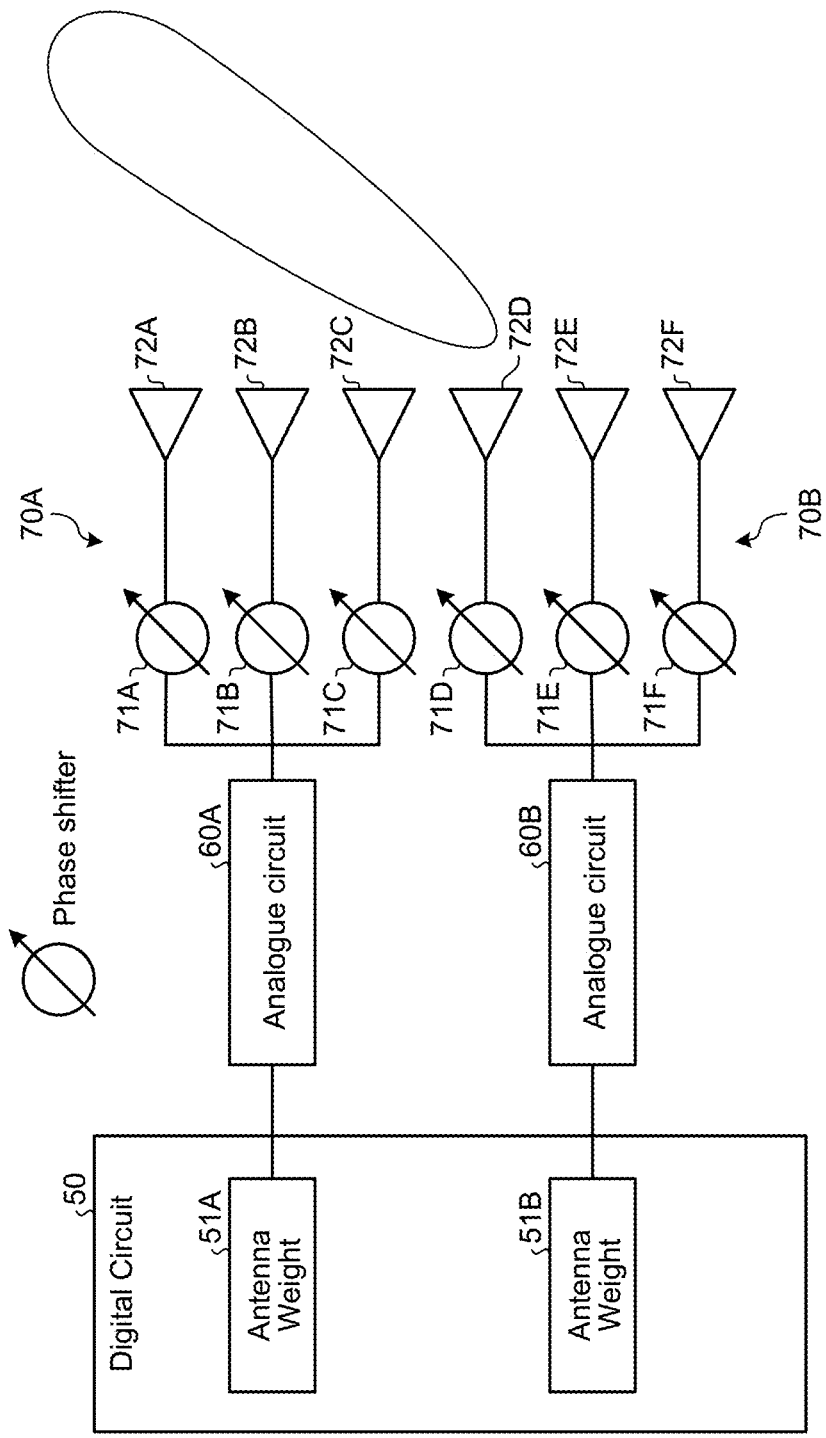

COMMUNICATION DEVICE, BASE STATION DEVICE, COMMUNICATION METHOD, AND BASE STATION DEVICE CONTROL METHOD

CROSS-REFERENCE TO RELATED APPLICATIONS

The present application is based on PCT filing PCT/JP2020/012333, filed Mar. 19, 2020, which claims priority to JP 2019-065151, filed Mar. 28, 2019, the entire contents of each are incorporated herein by reference.

FIELD

The present disclosure relates to a communication device, a base station device, a communication method, and a base station device control method.

BACKGROUND

Various radio access methods and radio networks in cellular mobile communications (hereinafter, also referred to as "Long Term Evolution (LTE)", "LTE-Advanced (LTE-A)", "LTE-Advanced Pro (LTE-A Pro)", "Fifth generation (5G)", "New Radio (NR)", "New Radio Access Technology (NRAT)", "Evolved Universal Terrestrial Radio Access (EUTRA)", or "Further EUTRA (FEUTRA)") are under examination in 3rd Generation Partnership Project (3GPP). In the following description, LTE includes LTE-A, LTE-A Pro, and EUTRA, and NR includes NRAT and FEUTRA. In LTE and NR, a base station device (base station) is also referred to as an evolved Node B (eNodeB) in LTE and referred to as gNodeB in NR, while a terminal device (mobile station, mobile station device, or terminal) is also referred to as User Equipment (UE). LTE and NR are cellular communication systems that arrange a plurality of areas covered by the base station, as cellular areas. A single base station may manage a plurality of cells.

CITATION LIST

Non Patent Literature

Non Patent Literature 1: "3GPP TS 38.214 version 15.2.0 Release 15", [online], [Searched on Mar. 26, 2019], Internet (https://www.etsi.org/deliver/etsi_ts/138200_138299/138214/15.02.00_60/ts_138214v150200p.pdf)

SUMMARY

Technical Problem

When user data is transmitted from a base station to a terminal device, the user data is scheduled by control information. In this case, the base station might be able to designate a combination of the receiving antenna panel and the receiving beam on the terminal device in the control information. However, when the terminal cannot make the settings for the combination of the receiving antenna panel and the receiving beam by the time of user data reception, the default combination might be set.

It is assumed that a time offset value is used to determine whether the setting is in time, that is, falls between the reception of the control information and the reception of the user data by the terminal device. However, when the terminal has a plurality of receiving antenna panels, the time for determining whether the setting is in time might differ depending on the combination of the receiving antenna panel, the receiving beam, or the like designated by the control information.

In view of this, the present disclosure proposes a communication device, a base station device, a communication method, and a base station device control method capable of setting an appropriate time offset value according to a situation.

Solution to Problem

A communication device includes a determination unit and a selection unit. The determination unit determines a plurality of time offset values for determining a combination of a receiving antenna panel and a receiving beam for user data scheduled by control information transmitted from a base station. The selection unit selects a time offset value for determining the combination of the receiving antenna panel and the receiving beam for the user data from among the plurality of time offset values based on the control information received from the base station.

BRIEF DESCRIPTION OF DRAWINGS

FIG. 6A is a diagram illustrating an example of an analogue-digital hybrid antenna architecture.

DESCRIPTION OF EMBODIMENTS

Figure 1:
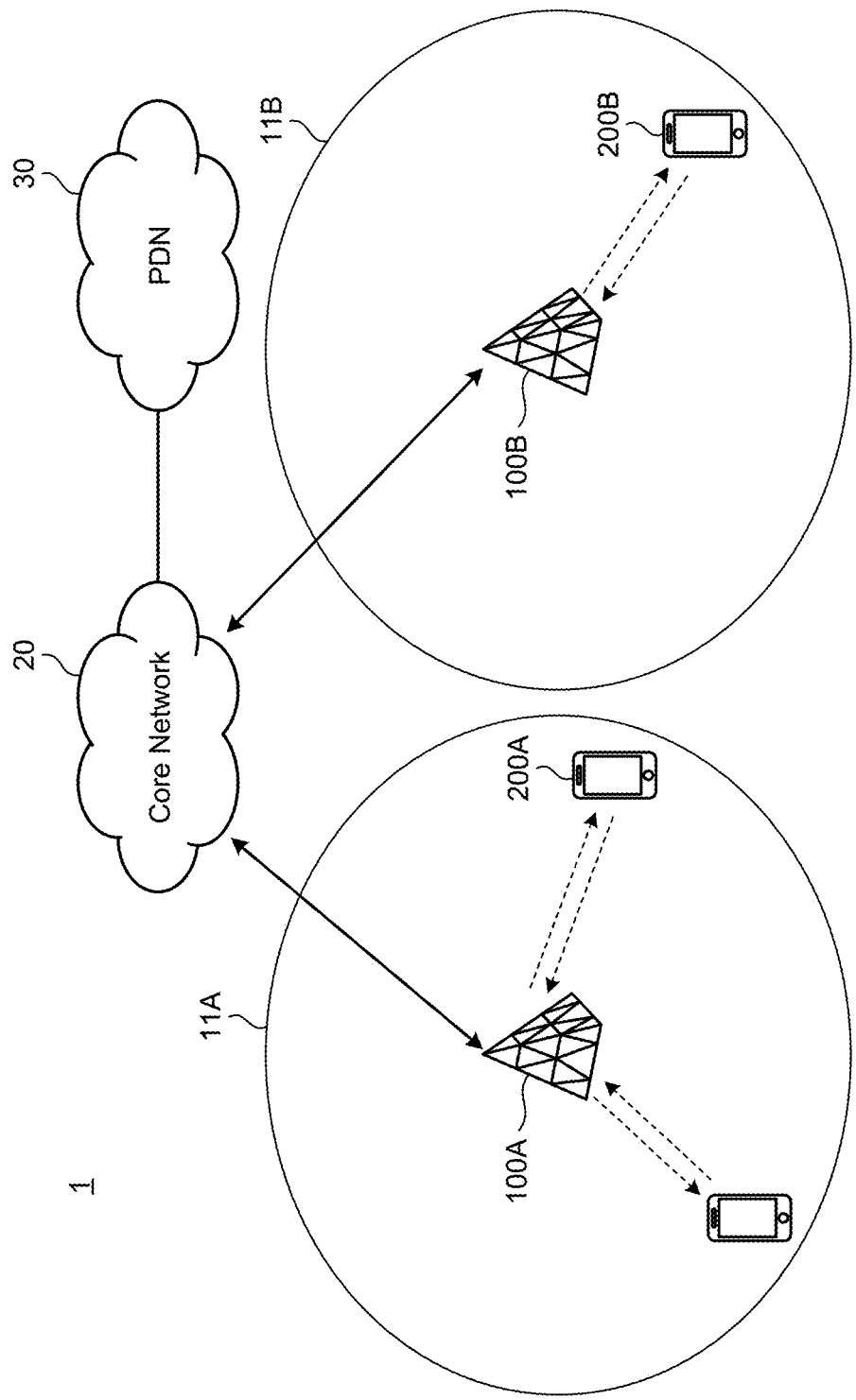
FIG. 1 is a diagram illustrating an example of an entire configuration of a communication system according to an embodiment of the present disclosure.

Embodiments of the present disclosure will be described below in detail with reference to the drawings. In each of the following embodiments, the same parts are denoted by the same reference numerals, and a repetitive description thereof will be omitted.

Moreover, in the present specification and the drawings, a plurality of components having substantially the same functional configuration will be distinguished by attaching different numbers after the same reference numerals. However, when it is not particularly necessary to distinguish between the plurality of components having substantially the same functional configuration, only the same reference numeral is given.

The present disclosure will be described in the following order.

1. Introduction
1.1. System configuration
1.2. Related technologies
1.3. Outline of proposed technology
2. Configuration examples
2.1. Configuration example of base station
2.2. Configuration example of terminal device
3. Embodiments
4. Application examples
4.1. Examples of application to NR in 3GPP standard
4.2. Application examples related to base station
4.3. Application examples related to terminal devices
5. Modifications
6. Summary 1. Introduction <1.1. System Configuration>

FIG. 1 is a diagram illustrating an example of an entire configuration of a communication system 1 according to an embodiment of the present disclosure. As illustrated in FIG. 1, the communication system 1 includes base stations 100 (100A and 100B), terminal devices 200 (200A and 200B), a core network 20, and a packet data network (PDN) (or simply referred to as data network (DN)) 30.

The base station 100 is a base station device installed in a base station, which is a communication device that manages cells 11 (11A and 11B) and provides radio services to one or more terminal devices located inside the cell 11. For example, the base station 100A provides a radio service to the terminal device 200A, while the base station 100B provides a radio service to the terminal device 200B. The cell 11 can be managed according to a certain radio communication system such as LTE or New Radio (NR). The base station 100 may be any of eNodeB, ng-eNodeB, gNodeB, or en-gNodeB. In addition to or instead of this, the base station 100 may be referred to as EUTRAN when the base station 100 is either eNodeB or en-gNodeB. In addition to or instead of this, the base station 100 may be referred to as NGRAN when the base station 100 is either gNodeB or ng-eNodeB. The base station 100 is connected to the core network 20. The core network 20 is connected to the PDN 30.

When working as an EPC in LTE, for example, the core network 20 can include Mobility Management Entity (MME), Serving gateway (S-GW), PDN gateway (P-GW), Policy and Charging Rule Function (PCRF), and Home Subscriber Server (HSS). The MME is a control node that handles control plane signals and manages the moving state of the terminal device. The S-GW is a control node that handles user plane signals and is implemented as a gateway device that switches user information transfer routing. The P-GW is a control node that handles user plane signals and implemented as a gateway device that makes a connection point between the core network 20 and the PDN 30. The PCRF is a control node that controls policies such as Quality of Service (QoS) for bearers and billing. The HSS is a control node that handles subscriber data and controls services. Meanwhile, when working as a 5GC in NR, the core network 20 can include Access and mobility Management Function (AMF), Session Management Function (SMF), User-Plane Function (UPF), Policy Control Function (PCF), and Unified Data Management (UDM). The AMF is a control node that handles control plane signals and manages the moving state of the terminal device. The SMF is a control node that handles control plane signals and manages data transfer routing. The UPF is a control node that handles user plane signals and manages user information transfer routing. The PCF is a control node that controls policies. The UDM is a control node that handles subscriber data.

The terminal device 200 is a communication device that performs radio communication with the base station 100 under the control of the base station 100. The terminal device 200 may be a terminal referred to as User Equipment (UE). For example, the terminal device 200 transmits an uplink signal to the base station 100 and transmits a downlink signal from the base station 100.

<1.2. Related Technologies>

(1) Bandwidth Part (BWP)

Figure 2:
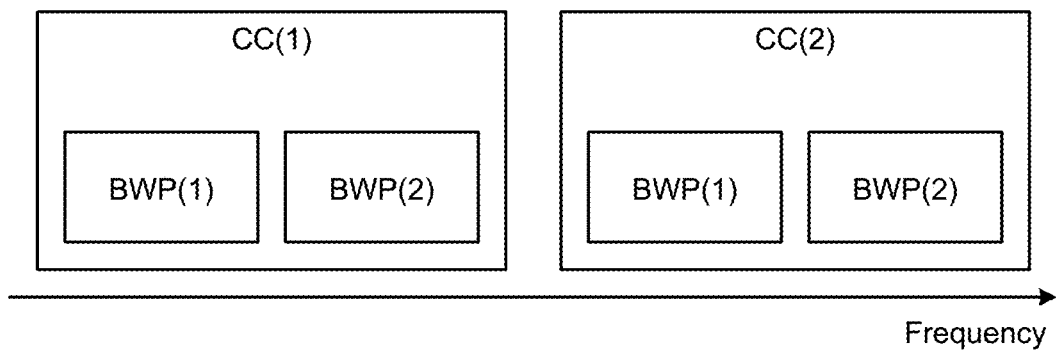
FIG. 2 is a diagram illustrating BWP.

FIG. 2 is a diagram illustrating a BWP. In the example of FIG. 2, Component Carrier (CC) #1 contains a plurality of BWPs (#1 and #2), and CC #2 contains a plurality of BWPs (#1 and #2). In the present specification, the number following the mark # represents an index (or an identifier). The BWPs contained in different CCs represent different BWPs even with an identical index. The BWP is obtained by dividing the CC, which is one operation band width, into a plurality of frequency bandwidths. In each of the BWPs, different Subcarrier spacings (e.g. Numerology) can be set. Note that one CC may include a Downlink Component Carrier and an Uplink Component Carrier, or may be either a Downlink Component Carrier or an Uplink Component Carrier. Moreover, one CC may correspond to one cell. That is, a plurality of BWPs may be included in one cell.

This BWP has been standardized in the NR feature of 3GPP Re115. The BWP can also be defined as a subset of the total cell bandwidth regarding one cell. In the Orthogonal Frequency Division Multiplexing (OFDM) modulation method standardized on LTE in Re18, the subcarrier spacing is fixed at 15 kHz. By contrast, in the NR feature of Re115, the subcarrier spacing can be set to 15 kHz, 30 kHz, 60 kHz, 120 kHz, or 240 kHz. The longer the subcarrier spacing, the shorter the OFDM symbol length. For example, the subcarrier spacing is 15 kHz in LTE, which has enabled transmission of two slots per 1 ms (millisecond) (i.e. 1 subframe), in other words, enabling transmission of 14 OFDM symbols. By contrast, in NR, the subcarrier spacing of 60 kHz enables transmission of four slots per 1 ms, while the subcarrier spacing of 120 kHz enables transmission of eight slots per 1 ms, and subcarrier spacing of 240 kHz enables transmission of 16 slots per 1 ms. In this manner, extending the subcarrier would shorten the OFDM symbol length. This makes it possible to provide a frame configuration suitable for low-latency communication.

The NR makes it possible to set the BWPs with different subcarrier spacing settings to the terminal at the same time. Accordingly, the NR can provide a plurality of BWPs for different use cases at the same time.

(2) Number of Active BWPs

The BWP that can be used for transmission and reception is also referred to as an active BWP. In 3GPP, the active BWP is also defined as a UE operating bandwidth within a cell operating bandwidth. The number of BWPs that the base station 100 can transmit and receive at the same time is also referred to as the number of active BWPs. The number of active BWPs of the base station 100 may be plural. In contrast, the number of active BWPs of the terminal device 200 is one in the case of the UE of 3GPP Re1.15. However, in the present specification, the number of active BWPs of the terminal device 200 may be plural. In the technique according to the present disclosure, the number of active BWPs of the terminal device 200 is assumed to be one.

(3) Relationship Between Cell (or CC), Carrier, and BWP

In the present disclosure, a plurality of cells may be allowed to overlap each other in the frequency direction in one carrier. For example, a plurality of Synchronization Signal/PBCH blocks (SSBs) may be transmitted at a plurality of frequency spans in one carrier. However, from the viewpoint of UE (that is, the terminal device 200), each of cells (serving cells) is associated with at most one SSB (that is, a Cell-defining SSB). The UE (terminal device 200) uses the BWP associated with the Cell-defining SSB as an Initial BWP. Furthermore, the UE (terminal device 200) may use a Dedicated BWP constituted with one or more frequency spans in the same carrier as the Initial BWP, in addition to the Initial BWP. From a UE (terminal device 200) perspective, the Initial BWP and the additional Dedicated BWP are associated with one cell. The present embodiment may include a case where the terminal device 200 uses a plurality of BWPs at the same time point.

(4) Codebook Based Beamforming

With beamforming performed in communicating with the terminal device 200, the base station 100 can improve the communication quality, for example. Beamforming methods include a method of generating a beam that tracks the terminal device 200 and a method of selecting a beam that tracks the terminal device 200 from among candidate beams. The former method might not be adopted in cellular radio communication systems (for example, 5G) because of the computational cost of generating a beam each time. By contrast, the latter method is adopted in Full Dimension Multiple Input Multiple Output (FD-MIMO) in Release 13 of Third Generation Partnership Project (3GPP). The latter method is also referred to as codebook based beamforming.

In the codebook based beamforming, the base station 100 prepares (that is, generates) beams in all directions in advance, and selects the beam suitable for the target terminal device 200 from among the prepared beams so as to communicate with the terminal device 200 using the selected beam. For example, when capable of communicating in 360 degrees in the horizontal direction, for example, the base station 100 prepares 360 types of beams in increments of 1 degree. When allowing the beams to be half overlapped with each other, the base station 100 prepares 720 types of beams. In the vertical direction, the base station 100 prepares a beam for 180 degrees ranging from −90 degrees to +90 degrees, for example.

The terminal device 200 only monitors the beam, and thus, has no high need for grasping the existence of the codebook on the base station 100 side.

In the following, a plurality of beams prepared in advance by the base station 100 is also referred to as a beam group. The beam group can be defined for each of frequency bands, for example. The beam group can also be defined for each of Rx/Tx beams, or for each of downlinks/uplinks. The plurality of beams prepared or managed by the base station 100 may be associated with one cell (i.e. the plurality of beams may constitute one cell). Alternatively, the plurality of beams prepared or managed by the base station 100 may be associated with a plurality of cells (i.e. the plurality of beams may constitute a plurality of cells).

(5) Beam Sweeping

In the NR, in order to select the optimum beam to be used for communication, beam sweeping, which transmits or receives a measurement signal (known signal) by using each of a plurality of beams belonging to a beam group, has been examined. The measurement signal is also referred to as a reference signal in some cases. When the measurement signal is a downlink signal, the measurement signal may include Synchronization Signal block (SSB)/Physical Broadcast Channel (PBCH) block, or Channel State Information-Reference Signal (CSI-RS). Based on the measurement result of the measurement signal (i.e. measurement signal of each of beams) transmitted from the base station with beam sweeping, the terminal can select the optimum transmission-oriented beam (hereinafter, also referred to as a transmitting beam). An example of this will be described with reference to FIG. 3.

Figure 3:
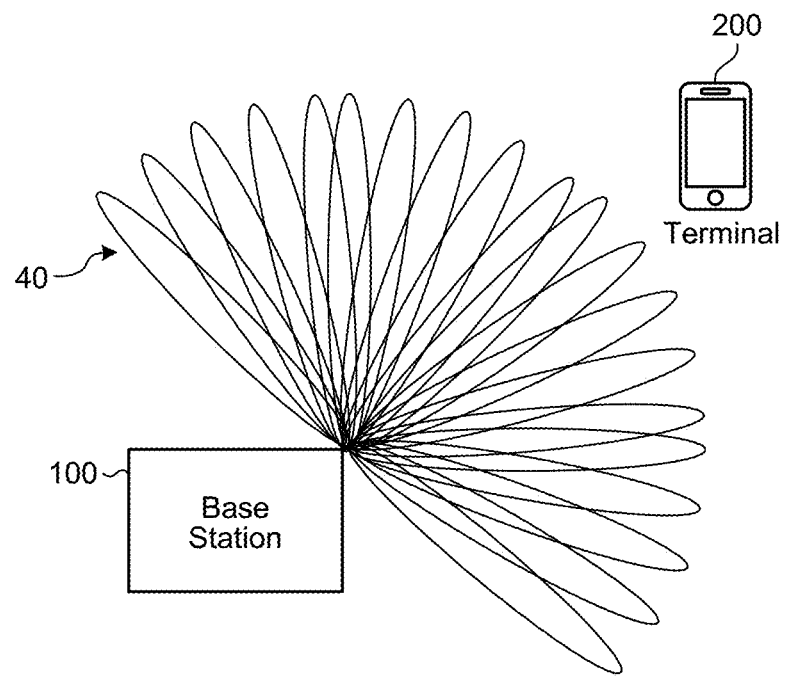
FIG. 3 is a diagram illustrating beam sweeping.

FIG. 3 is a diagram illustrating beam sweeping. In an example illustrated in FIG. 3, the base station 100 transmits a measurement signal with beam sweeping (that is, switching the transmitting beam) using the beam group 40. In addition, transmission with beam sweeping is also referred to as beam sweeping transmission below. Thereafter, the terminal device 200 measures the measurement signal obtained by beam sweeping transmission and determines which of the transmitting beams is most likely to be received. In this manner, the optimum transmitting beam of the base station 100 for the terminal device 200 is selected. By exchanging the base station 100 and the terminal device 200 and executing the similar procedure, the base station 100 can select the optimum transmitting beam of the terminal device 200.

On the other hand, the optimum reception-oriented beam (hereinafter, also referred to as a receiving beam, or a beam) can be selected based on the measurement result obtained by receiving the measurement signal with beam sweeping. For example, the terminal device 200 transmits a measurement signal by an uplink. Thereafter, the base station 100 receives the measurement signal with beam sweeping (that is, switching the receiving beams), and determines which of the receiving beams is most likely to be received. In this manner, the optimum receiving beam of the base station 100 is selected. By exchanging the base station 100 and the terminal device 200 and executing the similar procedure, the terminal device 200 can select the optimum receiving beam of the terminal device 200. In addition, reception with beam sweeping is also referred to as beam sweeping reception below.

The reception and measurement side of a measurement signal transmitted by beam sweeping transmission reports the measurement result to the transmitting side of the measurement signal. The measurement result may include information indicating which of the transmitting beams is optimal (e.g. beam identifier, time, preamble, or the like). The optimum transmitting beam is a transmitting beam having the highest reception power, for example. The measurement result may include information indicating one transmitting beam having the highest reception power, or may include information indicating the top K transmitting beams in order from the one having the highest reception power. The measurement result includes, for example, identification information of the transmitting beam (for example, the index of the beam) and information indicating the magnitude of the reception power of the transmitting beam (for example, Reference Signal Received Power (RSRP)) in association with each other.

The beam used in beam sweeping is transmitted by giving directivity to the reference signal which is a known signal. Therefore, the terminal device 200 can discriminate the beam by using a resource being a reference signal.

The base station 100 can provide one beam using the resource of one reference signal. That is, with preparation of ten resources, the base station 100 can perform beam sweeping corresponding to ten different directions. Ten resources can be collectively referred to as a resource set. One resource set formed with ten resources can provide beam sweeping corresponding to ten directions.

(6) CSI Acquisition Procedure

A Channel State Information (CSI) acquisition procedure is executed after the optimum beam selection performed by the beam selection procedure including the beam sweeping described above. The CSI acquisition procedure acquires the channel quality in communication using the selected beam. For example, the CSI acquisition procedure includes acquisition of a Channel Quality Indicator (CQI).

Channel quality is used to determine communication parameters such as modulation methods. Adoption of a modulation method capable of transmitting only a few bits even with good channel quality, for example, Quadrature Phase Shift Keying (QPSK), would cause a low throughput. On the other hand, adoption of a modulation method capable of transmitting a large amount of bits, such as 256 Quadrature Amplitude Modulation (QAM) even with poor channel quality would lead to a failure in data reception (i.e. decoding) on the receiving side, resulting in a low throughput as well. In this manner, proper acquisition of channel quality is important in order to improve the throughput.

Figure 4:
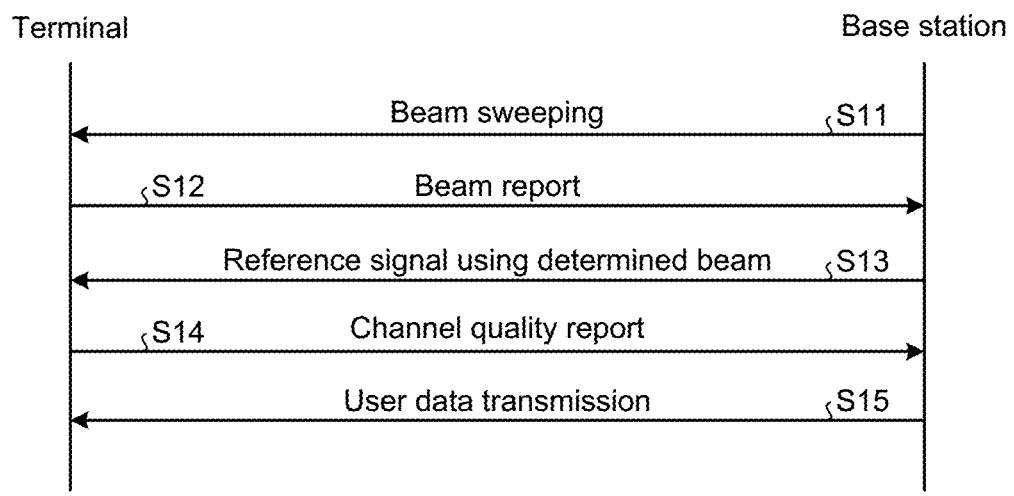
FIG. 4 is a sequence diagram illustrating an example of a flow of a typical beam selection procedure and CSI acquisition procedure executed by a base station and a terminal device.

FIG. 4 is a sequence diagram illustrating an example of a flow of a typical beam selection procedure and a CSI acquisition procedure executed by a base station and a terminal device. As illustrated in FIG. 4, the base station uses beam sweeping to transmit a measurement signal (e.g. SSB) for beam selection (step S11). Next, the terminal device measures the measurement signal for beam selection and reports a beam measurement result (beam report) to the base station (step S12). The measurement result includes, for example, information (e.g. index associated with the best beam) indicating the selection result of the optimum transmitting beam of the base station. The base station then transmits a measurement signal (e.g. CSI-RS) for channel quality acquisition using the selected optimum beam (step S13). Next, the terminal device reports the acquired channel quality to the base station based on the measurement result of the measurement signal (step S14). Thereafter, the base station transmits user information to the terminal device by using the communication parameters based on the reported channel quality (step S15). From the above, a beam report, which includes the measurement result of the measurement signal for beam selection received by the base station or the terminal, is transmitted to the terminal or the base station.

Downlink channel quality is measured based on the measurement signal transmitted over the downlink. Additionally, downlink channel quality can also be measured based on the measurement signal transmitted over the uplink. This is because the uplink channels and the downlink channels have reversibility, and have basically the same channel quality. Such reversibility is also referred to as channel reciprocity.

When measuring the downlink channel quality based on the downlink measurement signal, the measurement result of the measurement signal for channel quality acquisition is reported as illustrated in step S14 of FIG. 4. Reporting this measurement result can be a significant amount of overhead. A channel can be represented by an N×M matrix when the number of transmitting antennas is M and the number of receiving antennas is N. Each of elements of the matrix is a complex number corresponding to IQ. For example, in a case where each I/Q is represented by 10 bits, the number of transmitting antennas is 100, and the number of receiving antennas is eight, the report of the channel quality measurement result would use 8×100×2×10=16000 bits, which would be a significant amount of overhead.

In comparison, when measuring the downlink channel quality based on the uplink measurement signal, it is not necessary to report the measurement result because the measurement subject is the base station. Therefore, by measuring the downlink channel quality based on the uplink measurement signal, it is possible to reduce the overhead related to reporting the measurement result and improve the throughput. The flow of process in measuring the channel quality of the downlink based on the uplink measurement signal will be described with reference to FIG. 5.

Figure 5:
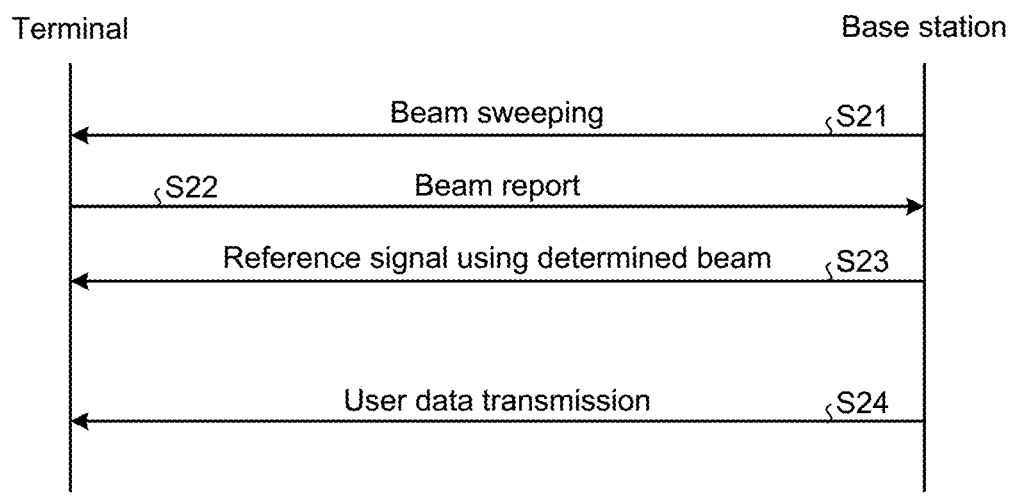
FIG. 5 is a sequence diagram illustrating another example of a flow of a typical beam selection procedure and CSI acquisition procedure executed by a base station and a terminal device.

FIG. 5 is a sequence diagram illustrating another example of a flow of a typical beam selection procedure and CSI acquisition procedure executed by a base station and a terminal device. As illustrated in FIG. 5, the terminal device transmits the measurement signal for beam selection by using beam sweeping transmission, and the base station receives the measurement signal by using beam sweeping (step S21). At that time, the base station selects the optimum transmitting beam of the terminal device and the optimum receiving beam of the base station based on the measurement result. Next, the base station reports the beam measurement result (beam report) to the terminal device (step S22). Such measurement result includes information indicating the selection result of the optimum transmitting beam of the terminal device. Next, the terminal device transmits a measurement signal for channel quality acquisition by using the selected transmitting beam (step S23). The base station acquires uplink channel quality based on the measurement result, and acquires downlink channel quality based on the uplink channel quality. Thereafter, the base station transmits user information to the terminal device using the communication parameters based on the acquired downlink channel quality (step S24). From the above, a beam report, which includes the measurement result of the measurement signal for beam selection received by the base station or the terminal, is transmitted to the terminal or the base station.

(7) Analogue-Digital Hybrid Antenna Architecture

In order to control the directivity of the antenna, there is an assumable architecture in which all processes are performed by an analogue circuit. Such an architecture is also referred to as a fully digital architecture. In a fully digital architecture, antenna weights as many as antennas (that is, antenna elements) are applied in a digital domain (that is, by a digital circuit) to control the directivity of the antenna. The antenna weight is a weight for controlling the amplitude and phase. Unfortunately, however, the fully digital architecture has a drawback of enlargement of the digital circuit. Examples of an architecture to overcome such a drawback of the fully digital architecture include an analogue-digital hybrid antenna architecture.

FIG. 6A is a diagram illustrating an example of an analogue-digital hybrid antenna architecture. The architecture illustrated in FIG. 6A includes a digital circuit 50, analogue circuits 60 (60A and 60B), and antenna panels 70 (70A and 70B). The digital circuit can apply a plurality of antenna weights 51 (51A and 51B). The analogue circuit 60 and the antenna panel 70 are provided in the same number as the number of antenna weights 51 applicable to the digital circuit 50. The antenna panel 70 includes a plurality of antennas 72 (72A to 72F) and phase shifters 71 (71A to 71F) as many as the number of antennas 72. The phase shifter 71 is a device that applies an antenna weight that can control the phase alone in an analogue domain.

The characteristics of the antenna weight in the digital domain and the antenna weight in the analogue domain are illustrated in Table 1 below.

TABLE 1

|  | Analogue domain | Digital domain |
|---|---|---|
| Controllable target | Phase | Amplitude and phase |
| Analogue or digital | Analogue | Digital |
| Arrangement position: time domain or frequency domain | Time domain | Frequency domain when OFDM modulation method is used and when arrangement is performed on FFT/IFFT back/front on receiving side/transmitting side |
| Is it possible to provide different beams in different frequencies in same time | Impossible | Possible |
| Is it possible to provide different beams in same frequency in same time | Impossible | Possible |

Antenna weights in the digital domain are applied in a frequency domain when OFDM modulation method is used. For example, the antenna weight in the digital domain is applied before Inverse Fast Fourier Transform (IFFT) at the time of transmission and applied after Fast Fourier Transform (FFT) at the time of reception.

Antenna weights in the digital domain are applied in the frequency domain. Therefore, by applying the antenna weights in the digital domain, it is possible to transmit a beam in different directions using different frequency resources even when the time resources are the same. On the other hand, the antenna weights in the analogue domain are applied in a time domain. Therefore, even when the antenna weight in the analogue domain is applied, the beam can be directed only in the same direction over all frequency resources with the same time resource.

That is, each of the antenna panels 70 can transmit a beam in different directions using different frequency resources even with the same time resource. On the other hand, one antenna panel 70 can direct the beam in only one direction using the same time resource and frequency resource. Therefore, in the analogue-digital hybrid antenna architecture, the number of directions of the beam that can be transmitted and received in the same time resource corresponds to the number of antenna panels 70. Furthermore, in the analogue-digital hybrid antenna architecture, the number of beam groups that be handled by beam sweeping transmission or beam sweeping reception in the same time resource corresponds to the number of antenna panels 70.

Such an analogue-digital hybrid antenna architecture can be adopted in both the base station 100 and the terminal device 200.

(8) Antenna Panel

In FIG. 6A, three analogue domain phase shifters are connected to one digital domain weight. The one digital domain weight and the three analogue domain phase shifters can be arranged as a set as an antenna panel. FIG. 6A illustrates an example in which two antenna panels are provided, each of the antenna panels being formed with three antenna elements. As illustrated in Table 1, usually it would not possible, with one panel, to form beams in different directions at the same time using different frequencies. However, it is possible, with two panels, to form beams in different directions, even at the same time. This antenna panel configuration is used on both the base station side and the terminal side.

Figure 6B:
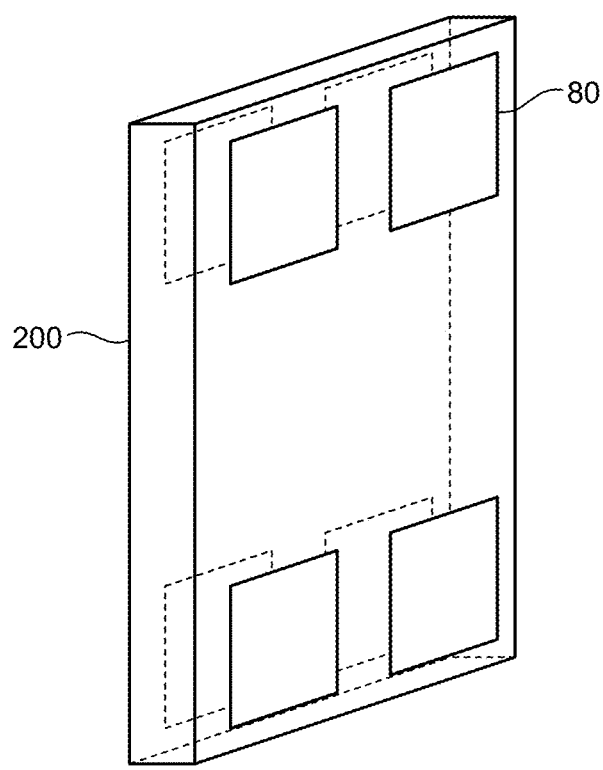
FIG. 6B is a diagram illustrating an example of arranging eight antenna panels in a terminal device.

FIG. 6B is a diagram illustrating an example of arranging eight antenna panels in the terminal device 200. FIG. 6B illustrates an example of arranging a total of eight antenna panels, specifically four on front surface and four on back surface of the terminal device 200. The number of antenna elements mounted on one antenna panel is not limited to a specific number. Still, four antenna elements are mounted on one antenna panel, for example. Since the four antenna panels arranged on the front surface, or the four antenna panels arranged on the back surface, are arranged so as to face the same direction, the panels here are referred to as coherent antenna panels. In contrast, the antenna panels on the front surface and the antenna panels on the back surface are referred to as non-coherent antenna panels.

(9) Reference Signal and User Information resource

In order to implement beam sweeping and the CSI acquisition procedure, it is necessary to transmit and receive the reference signal between the base station device 100 and the terminal device 200. Furthermore, when the user information is transmitted and received between the base station device 100 and the terminal device 200, it is also necessary to transmit and receive the reference signal. These reference signals are basically designated by frequency and time resources, and include some cases where resources are designated by using orthogonal sequences. In contrast, as for the user information, scheduling information included in the control signal designates the frequency and time resources of the user information. In the case of user information, orthogonal sequences are not to be assigned as resources. Only frequency and time resources are designated.

(10) Selecting Antenna Panel and Beam on the Receiving Side (10-1) Selecting Antenna Panel and Beam at Beam Management Stage During beam management, with trial-and-error (e.g. trial on each combination of the beam and the antenna panel one by one) on the terminal device 200 side on the beam coming from the base station 100, determination is made as to which beam and which antenna panel are to be used for reception. Basically, different antenna panels can operate at the same time. Therefore, when four resource areas in a resource block are set as reference signal resources for the same beam for a downlink beam, the terminal device 200 can use four different receiving beams for each of antenna panels to determine which is the desired receiving beam for the terminal device 200. Such an operation is performed for the number of downlink beams corresponding to different directions on the base station 100 side. When the number of downlink beams is ten, the terminal device 200 monitors the receiving beam using 10×4=40 resources, thereby enabling determination of the desired beam from the base station 100 as well as the antenna panel and the desired beam on the terminal device 200 side. In the present specification, for convenience of explanation, the combination of the receiving antenna panel and the receiving beam used by the terminal for reception is also referred to as a reception environment.

(10-2) Selecting Antenna Panel and Beam at CSI Procedure Stage

The CSI procedure stage is the stage where the base station 100 uses precoding for transmission (finer antenna control) and then confirms the quality of the channel in more detail. At the CSI procedure stage, the reference signal (CSI-RS) for the CSI procedure is received by using the antenna panel of the terminal device 200 identified in the previous beam management stage and using the beam determined to be the most desirable within the antenna panels.

(10-3) Selection of Antenna Panel and Beam at User Information Reception Stage

At the user information reception stage, the terminal device 200 may only be required to receive user information using the antenna panel and the receiving beam determined at the time of beam management, similarly to the CSI procedure stage. However, when there are two beams using such an antenna panel, the terminal device 200 cannot determine how to select the antenna panel and the beam.

Figure 7:
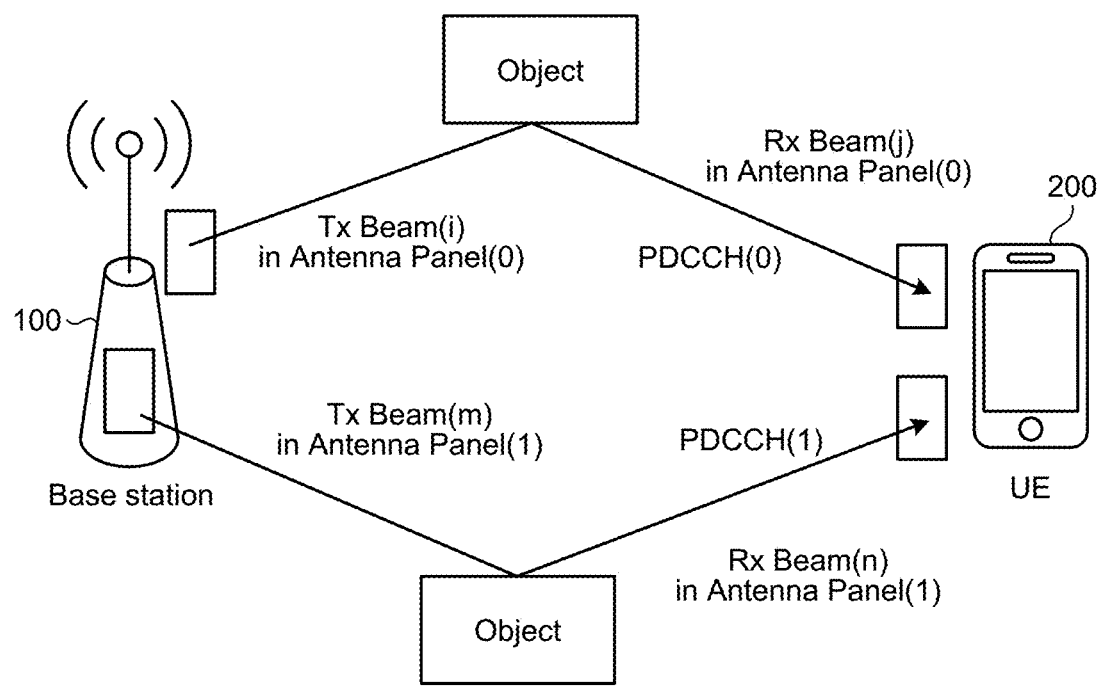
FIG. 7 is a diagram illustrating two beam sets.

FIG. 7 is a Diagram Illustrating Two Beam Sets. When the terminal device 200 has performed the beam management process twice and has determined the antenna panel and the beam of the terminal device 200 suitable for each of the beams transmitted from the two different antenna panels of the base station 100, there are two beam sets as illustrated in FIG. 7. Specifically, the two beams sets include a first beam set "Beam set (0): transmitting beam (i) in transmitting antenna panel (0)+receiving beam (j) in receiving antenna panel (0)", and a second beam set "Beam set (1): transmitting beam (m) in transmitting antenna panel (1)+receiving beam (n) in receiving antenna panel (1)". The beam set refers to a beam link constituted with a combination of antenna panels and beams on the transmitting side and the receiving side.

Furthermore, since control information (e.g. scheduling information), which is a control signal that designates a resource of user information, is transmitted using a beam, it is important to grasp which beam set is to be used to receive the control information by the terminal device 200. Examples of the control information include PHY Downlink Control Channel (PDCCH) or Downlink Control Information (DCI) transmitted by the PDCCH.

(10-4) Method of Designating Antenna Panel and Beam Used by Terminal

In FIG. 7, the base station 100 may explicitly or implicitly indicate to the terminal device 200 that reception of the PDCCH (0) is enabled by the receiving beam (j) of the receiving antenna panel (0). A conceivable example of this would be a method of directly designating the receiving antenna panel and the receiving beam of the terminal device 200.

On the other hand, for example, there is an assumable case where the base station 100 has transmitted "Reference Signal A" using the "transmitting beam (i) in the transmitting antenna panel (0)", and the terminal device 200 has received the "Reference Signal A" by using the "receiving beam (j) in the receiving antenna panel (0)". Furthermore, there is an assumable case where the base station 100 has transmitted "Reference Signal B" using the "transmitting beam (m) in the transmitting antenna panel (1)", and the terminal device 200 has received the "Reference Signal B" by using the "receiving beam (n) in the receiving antenna panel (1)". Based on this, before transmission of PDCCH (0), the base station 100 can instruct to use, at the time of receiving the PDCCH (0), the receiving antenna panel and the receiving beam used when receiving "Reference Signal A". In other words, it is possible to implicitly designate an instruction equivalent to the instruction to use the receiving beam (j) in the receiving antenna panel (0).

(10-5) Process with No Designation of Antenna Panel and Beam

In the above, the base station 100 clearly instructed the terminal device 200 to use the same receiving antenna panel and receiving beam as when receiving "Reference Signal A". However, there are cases where there is no instruction from the base station 100 or the setting of the instruction by the base station 100 is not in time, which leads to the necessity of performing a process for such a case. For example, it is conceivable to use the receiving antenna panel and the receiving beam used when the terminal device 200 synchronizes with the base station 100 as a default.

However, when synchronization signals (reference signals) are provided from different antenna panels of the base station 100, it is difficult to determine which antenna panel and beam used in reception of which synchronization signal should be used as the default.

(10-6) Synchronization Signal

Figure 8:
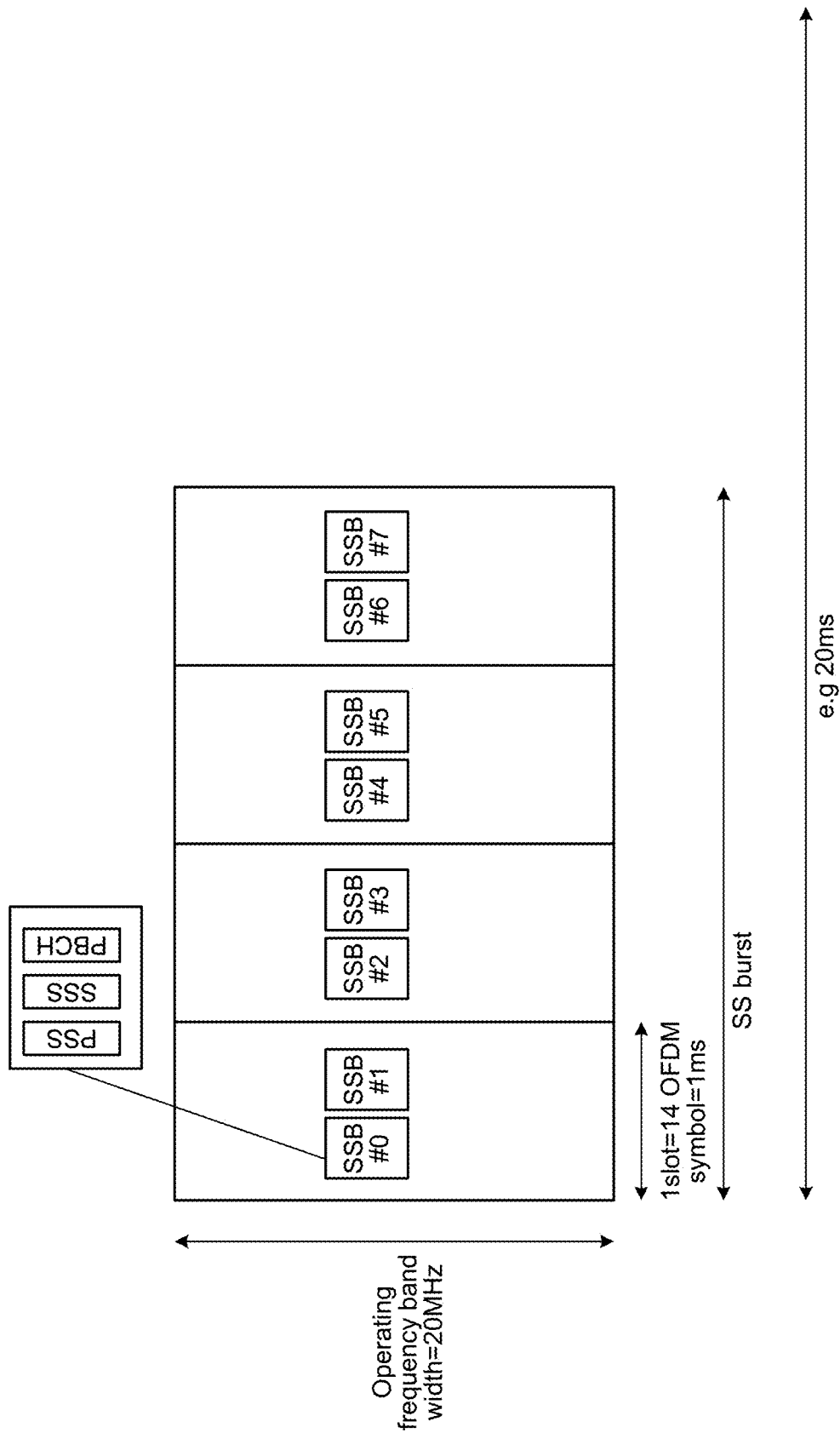
FIG. 8 is a diagram illustrating a synchronization signal.

Here, a synchronization signal will be described. FIG. 8 is a diagram illustrating an example of a synchronization signal. As illustrated in FIG. 8, the synchronization signal is a signal that periodically transmits an SSB burst. The SSB burst includes a plurality of SSBs that has undergone beamforming. The SSB contains a sequence of synchronization signals PSS and SSS and system information referred to as PBCH for broadcast. PSS and SSS are supposed to be used in the same manner as LTE. The base station 100 transmits each of SSBs using beams in different directions. Accordingly, the terminal device 200 receives the SSB facing the direction of the terminal device 200 and performs synchronization.

Figure 9:
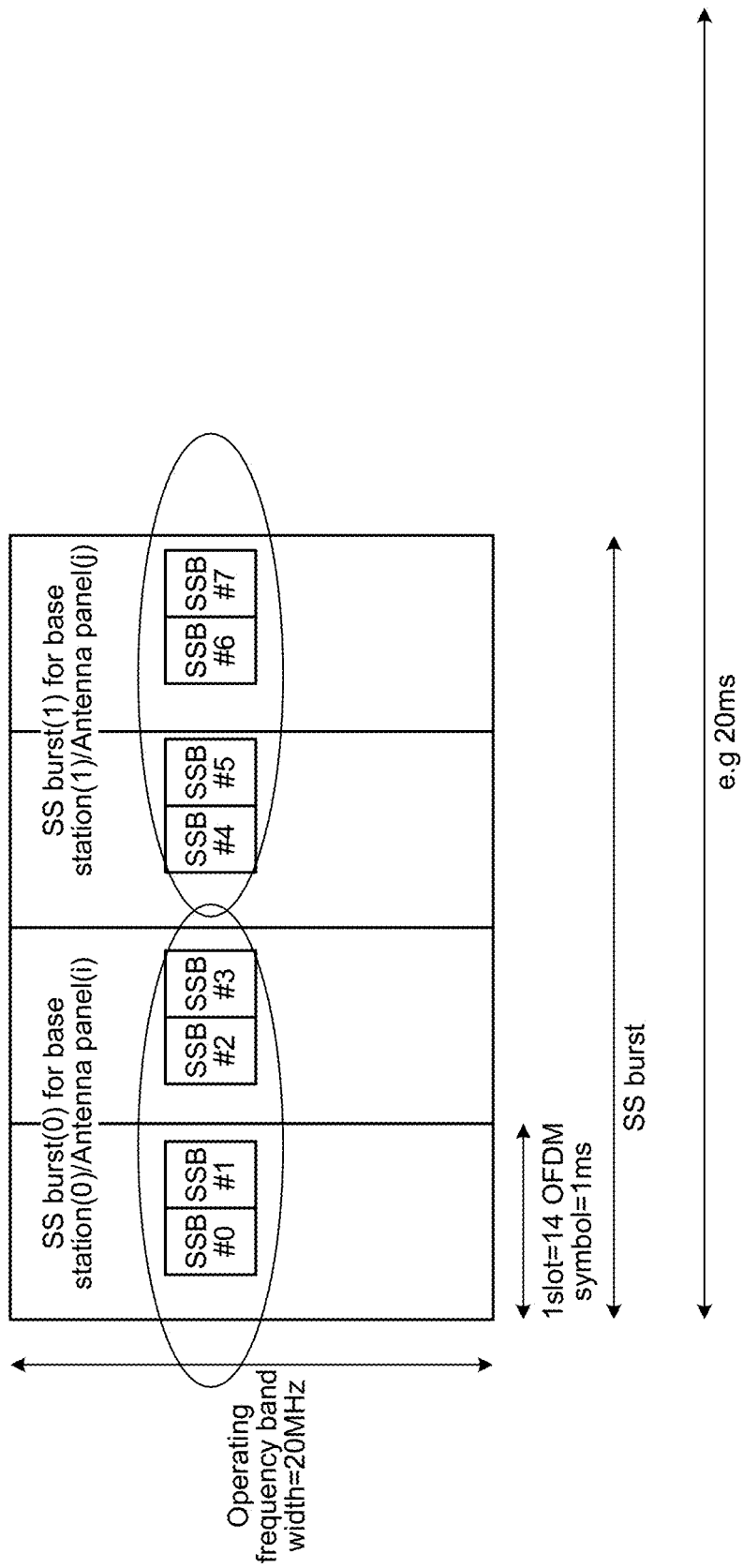
FIG. 9 is a diagram illustrating a synchronization signal.

Furthermore, FIG. 9 is a diagram illustrating an example of a synchronization signal when a different transmitting antenna panel is used for each of SSB bursts. As illustrated in FIG. 9, the base station 100 transmits the SSB contained in the SSB burst by using a different transmitting antenna panel for each of the SSB bursts. The terminal device 200 can synchronize with the SSB transmitted from the plurality of transmitting antenna panels, and at the same time, can grasp one or more optimum receiving antenna panels and receiving beams required when receiving the SSBs from the plurality of transmitting antenna panels. In this case, for example, as illustrated in FIG. 7, the terminal device 200 will grasp two sets of the receiving antenna panel and the receiving beam.

In this manner, in a case where the receiving antenna panel and receiving beam settings required for receiving control signals and user information are not in time with a plurality of optimum receiving antenna panels and receiving beam sets for receiving synchronization signals, the terminal device 200 cannot determine which antenna panel and beam should be used because of the presence of the plurality of sets, even with a rule that the set at reception of SSB is to be used as a default.

<1.3. Outline of Proposed Technology>

Conventionally, when the processing on the terminal device 200 side is not in time even when the receiving antenna panel and the receiving beam to be used by the terminal device 200 have been designated, the default reception environment has been used. However, there has been one type of time offset value to determine whether the processing is to be in time. Therefore, in multi-TRP/multi-antenna panel environments, there is a possibility that the reception environment cannot be set appropriately in various situations just with one type of time offset value.

To handle this, the terminal device 200 according to the embodiment operates by switching a plurality of time offset values by executing the communication method according to the embodiment. Specifically, the terminal device 200 according to the embodiment first acquires a plurality of time offset values for determining the user data reception environment designated by the control information transmitted from the base station 100. The plurality of time offset values may be received from the base station 100 or may be predetermined by a standard or the like. Subsequently, the terminal device 200 according to the embodiment selects a time offset value for determining the user data reception environment (combination of the receiving antenna panel and the receiving beam) from among a plurality of time offset values based on the control information received from the base station 100. Thereafter, the terminal device 200 according to the embodiment sets a reception environment for receiving the user data based on a magnitude relationship between the selected time offset value, and the time interval of the control information and the user data.

For example, when receiving control information and user data, the terminal device 200 according to the embodiment sets a time offset value according to whether the receiving antenna panel is switched or sets a time offset value according to whether a plurality of pieces of user data overlaps each other.

That is, in the communication method according to the embodiment, a plurality of time offset values is switched according to the reception situation of the user data, making it possible to set an appropriate time offset value according to the situation.

2. Configuration Examples

Hereinafter, the configurations of the base station 100 (base station device 100) and the terminal device 200 according to the present embodiment will be described in detail.

<2.1. Configuration Example of Base Station>

Figure 10:
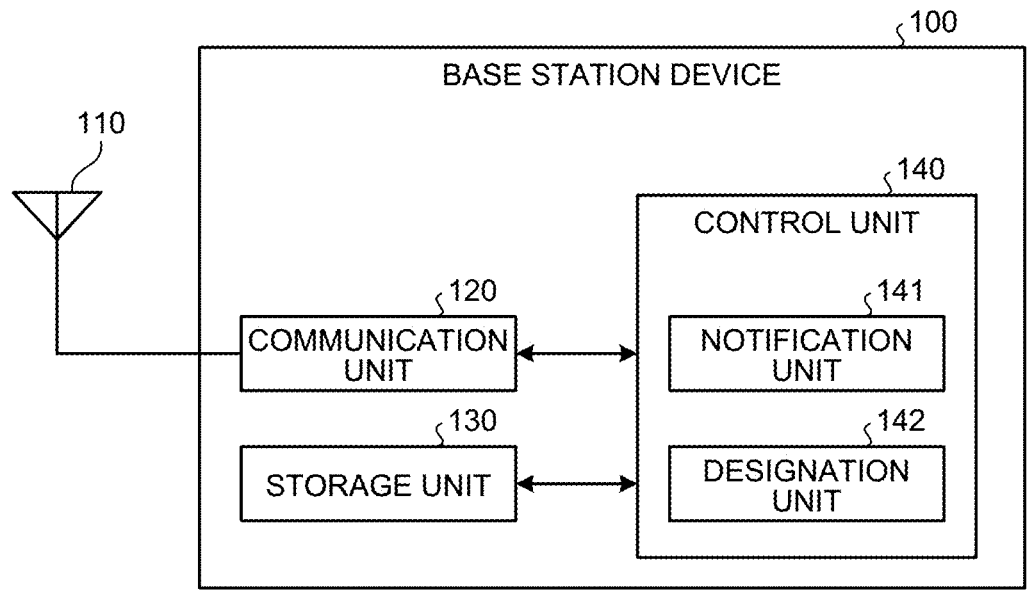
FIG. 10 is a block diagram illustrating an example of a configuration of a base station device according to an embodiment.

FIG. 10 is a block diagram illustrating an example of a configuration of the base station device 100 according to the embodiment. As illustrated in FIG. 10, the base station device 100 includes an antenna unit 110, a communication unit 120, a storage unit 130, and a control unit 140.

The antenna unit 110 radiates the signal output by the communication unit 120 to space as a radio wave. Furthermore, the antenna unit 110 converts the radio wave in space into a signal and outputs the signal to the communication unit 120. Specifically, the antenna unit 110 has a plurality of antenna elements and can form a beam.

The communication unit 120 transmits and receives signals by radio communication. For example, the communication unit 120 receives a uplink signal from the terminal device 200 and transmits an downlink signal to the terminal device 200.

Incidentally, the antenna unit 110 and the communication unit 120 are provided as a configuration including the plurality of antenna panels 70 having the analogue-digital hybrid antenna architecture described above. For example, the antenna unit 110 corresponds to the antenna 72. Furthermore, for example, the communication unit 120 corresponds to the digital circuit 50, the analogue circuit 60, and the phase shifter 71.

The storage unit 130 temporarily or permanently stores various programs and various types of data for the operation of the base station device 100.

The control unit 140 controls the operation of the entire base station device 100 to provide various functions of the base station device 100. As illustrated in FIG. 10, the control unit 140 includes a notification unit 141 and a designation unit 142.

The notification unit 141 notifies the terminal device 200 of a plurality of time offset values for determining the reception environment (combination of the receiving antenna panel and the receiving beam) for the user data scheduled by the control information transmitted to the terminal device 200. This notification may be made by using RRC signaling (e.g. RRC Setup message or RRC Reconfiguration message), for example. The time offset value can also be expressed as a duration of time during which the terminal device 200 can switch the receiving antenna panel or the receiving beam. In other words, it can be rephrased as one of the capabilities of the terminal device 200. In a case where the terminal device 200 reports a plurality of time offset values to the base station device 100 as its own capability, operations of the notification unit 141 would not be essential.

When transmitting control information (e.g. PDCCH), the designation unit 142 designates a time offset value for determining the user data reception environment from among a plurality of time offset values. This time offset value may be designated in the Downlink Control Information transmitted by the PDCCH. In addition to or instead of this, this designation may be made explicitly or implicitly as the designation of the time offset value. For example, the time offset value may be designated by an index corresponding to the time offset value.

Detailed operation of each of configurations in the control unit 140 of the base station device 100 will be described below.

<2.2. Configuration Example of Terminal Device>

Figure 11:
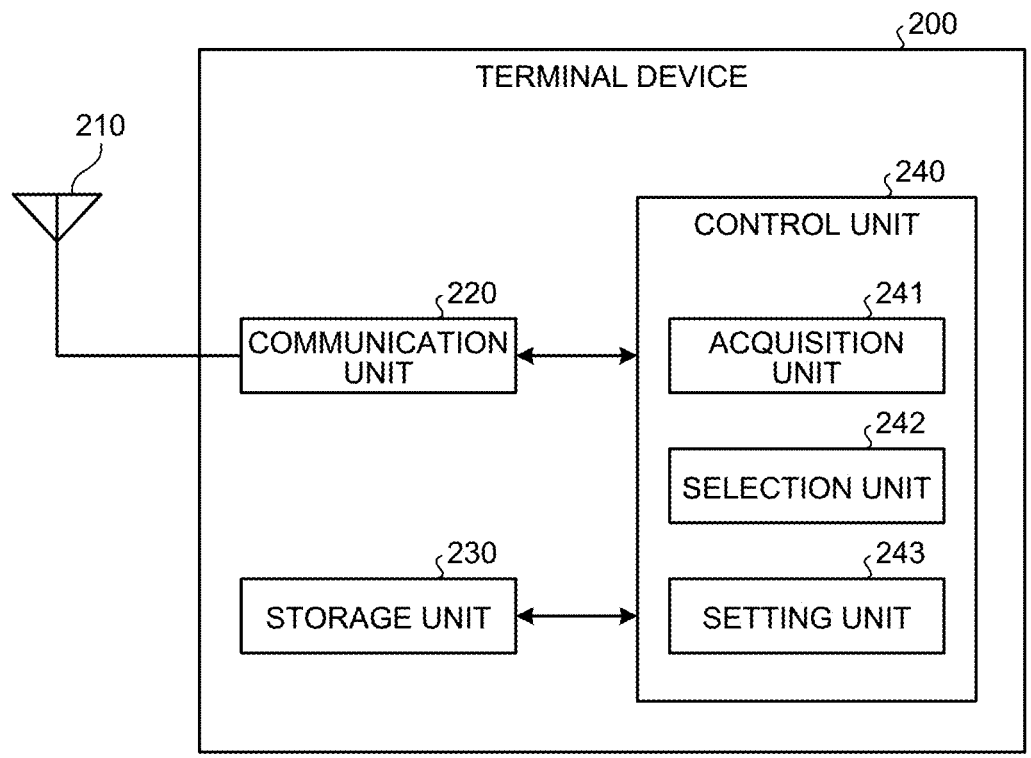
FIG. 11 is a block diagram illustrating an example of a configuration of a terminal device according to an embodiment.

FIG. 11 is a block diagram illustrating an example of a configuration of the terminal device 200 according to the embodiment. As illustrated in FIG. 11, the terminal device 200 includes an antenna unit 210, a communication unit 220, a storage unit 230, and a control unit 240.

The antenna unit 210 radiates the signal output by the communication unit 220 to space as a radio wave. Furthermore, the antenna unit 210 converts the radio wave in space into a signal and outputs the signal to the communication unit 220. Specifically, the antenna unit 210 has a plurality of antenna elements and can form a beam.

The communication unit 220 transmits and receives signals by radio communication. For example, the communication unit 220 receives a downlink signal from the base station 100 and transmits an uplink signal to the base station 100.

The antenna unit 210 and the communication unit 220 are provided as a configuration including the plurality of antenna panels 70 having the analogue-digital hybrid antenna architecture described above. For example, the antenna unit 210 corresponds to the antenna 72. Furthermore, for example, the communication unit 220 corresponds to the digital circuit 50, the analogue circuit 60, and the phase shifter 71.

The storage unit 230 temporarily or permanently stores various programs and various types of data for the operation of the terminal device 200.

The control unit 240 controls the operation of the entire terminal device 200 to provide various functions of the terminal device 200. As illustrated in FIG. 11, the control unit 240 includes a determination unit 241, a selection unit 242, and a setting unit 243.

The determination unit 241 (an example of a determination unit) acquires (determines) various types of information from the base station 100. For example, the determination unit 241 acquires a plurality of time offset values (or index of each of values) for determining the reception environment (combination of the receiving antenna panel and the receiving beam) for the user data designated by the control information transmitted from the base station 100. For example, the determination unit 241 acquires a plurality of time offset values including a first time offset value when the reception environment for the control information and the reception environment for the user data are the same, and a second time offset value when the reception environment for the control information and the reception environment for the user data are different. More specifically, the first time offset value is acquired when the receiving antenna panel to be used for receiving the PDSCH is the same as the receiving antenna panel used at the reception of the PDCCH that has scheduled the PDSCH. Moreover, the second time offset value is acquired when the receiving antenna panel to be used for receiving the PDSCH is different from the receiving antenna panel used at the reception of the PDCCH that has scheduled the PDSCH. Furthermore, the determination unit 241 acquires control information including environment information indicating whether the reception environment for the user data (combination of the receiving antenna panel and the receiving beam) is the same as the reception environment for the control information. Furthermore, the determination unit 241 acquires the first time offset value when there is no overlapping in the reception environments (combination of the receiving antenna panel and the receiving beam) for a plurality of pieces of user data scheduled by each of the plurality of pieces of control information as well as the second time offset value when there is overlapping. Furthermore, the determination unit 241 acquires control information including overlap information indicating whether there is overlapping in the reception environments (combination of the receiving antenna panel and the receiving beam) for a plurality of pieces of user data. For example, the determination unit 241 acquires the second time offset value that is longer than the first time offset value.

The control unit 240 of the terminal device 200 may include a reporting unit (an example of a determination unit) in addition to or in place of the determination unit 241. The reporting unit may report to the base station device 100 a plurality of time values required for switching the reception environment (combination of the receiving antenna panel and the receiving beam) for the user data scheduled by the control information transmitted from the base station 100, as a time offset value. For example, a plurality of time offset values including a first time offset value when the reception environment for the control information and the reception environment for the user data are the same, and a second time offset value when the reception environment for the control information and the reception environment for the user data are different will be reported. More specifically, the first time offset value indicating the processing time when the receiving antenna panel that receives the PDSCH is the same as the receiving antenna panel used at the reception of the PDCCH scheduled for the PDSCH (i.e. when switching is unnecessary) will be reported. Moreover, the second time offset value indicating the processing time for a case where the receiving antenna panel to be used for receiving the PDSCH is different from the receiving antenna panel used at the reception of the PDCCH that has scheduled the PDSCH (i.e. when switching is necessary) will be reported. For example, the reporting unit reports the second time offset value that is longer than the first time offset value. The report may be made by RRC signaling (UECapbilityInformation message).

The selection unit 242 selects a time offset value for determining the user data reception environment (combination of the receiving antenna panel and the receiving beam) from among a plurality of time offset values based on the control information received from the base station 100. For example, the selection unit 242 selects one of the first time offset value or the second time offset value based on the control information. Furthermore, the selection unit 242 selects one of the first time offset value or the second time offset value based on the environment information in the control information. Furthermore, when the control information has been received in a reception environment in which the control information is preset, the selection unit 242 selects a third time offset value other than the first time offset value and the second time offset value. Furthermore, the selection unit 242 selects one of the first time offset value or the second time offset value based on the overlap information in the control information.

The setting unit 243 sets the user data reception environment (combination of the receiving antenna panel and the receiving beam) based on the time offset value selected by the selection unit 242. Specifically, when the time interval between the control information and the user data is less than the time offset value, the setting unit 243 sets the user data reception environment to a preset reception environment, that is, a default reception environment (combination of the receiving antenna panel and receiving beam). When the time interval between the control information and the user data is the time offset value or more, the setting unit 243 sets the reception environment (combination of the receiving antenna panel and the receiving beam) designated by the control information, as the user data reception environment (combination of receiving antenna panel and the receiving beam). In addition, the setting unit 243 sets the reception environment at the time of reception of the control information, as the preset reception environment (default reception environment).

Hereinafter, with reference to FIGS. 12 to 18, detailed operations of individual configurations in the control unit 140 of the base station device 100 and individual configurations in the control unit 240 of the terminal device 200 will be described.

3. Embodiments

Figure 12:
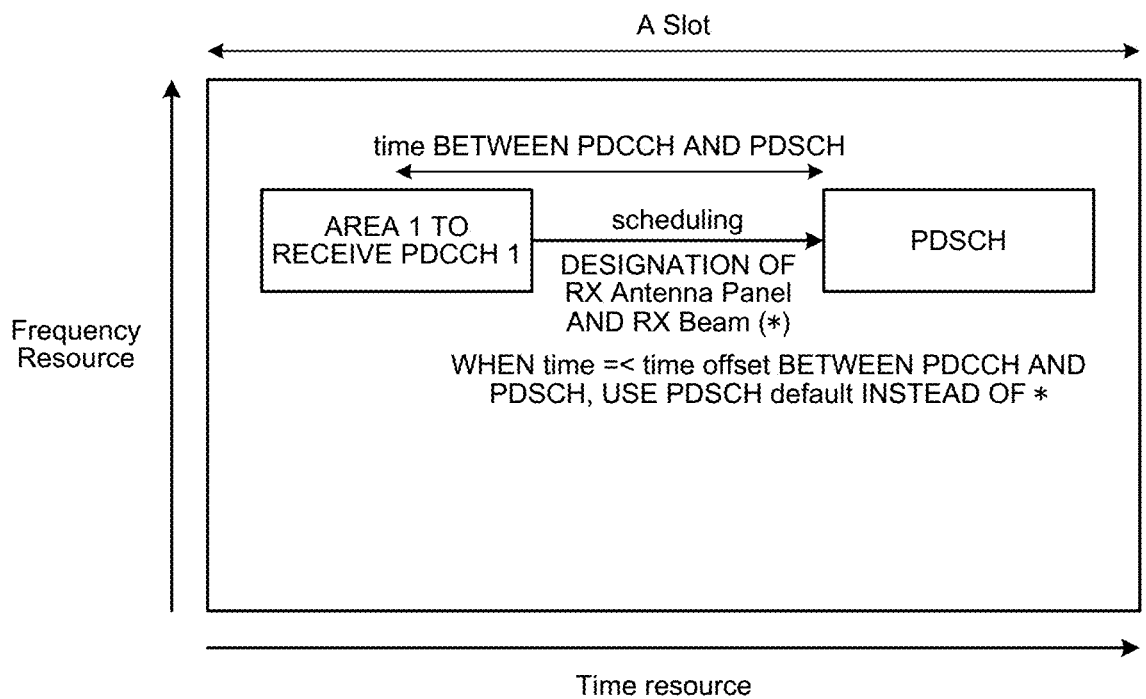
FIG. 12 is a diagram illustrating a resource area in which PDCCH and PDSCH are set.
Figure 13:
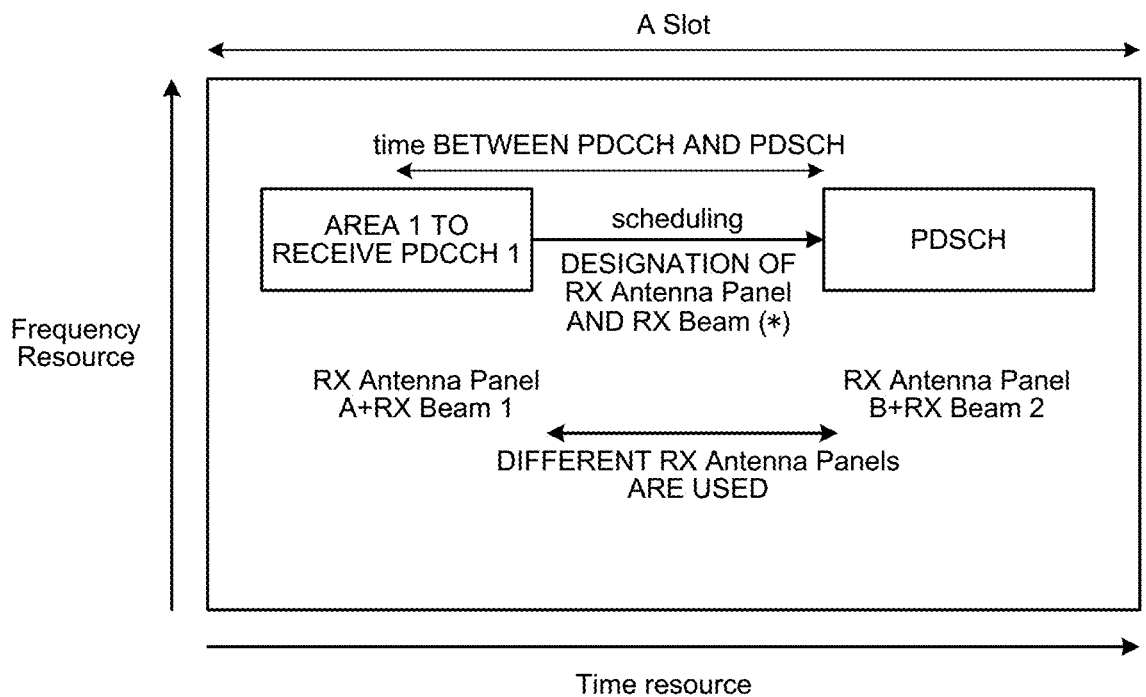
FIG. 13 is a diagram illustrating a resource area in which PDCCH and PDSCH are set.
Figure 14:
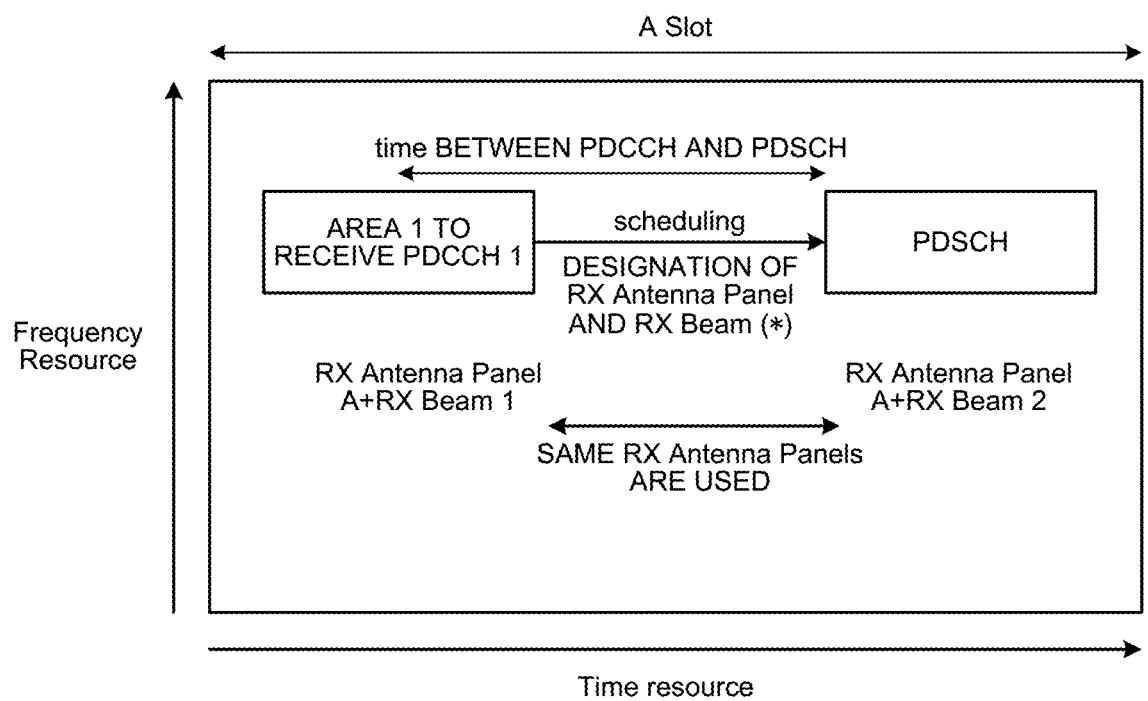
FIG. 14 is a diagram illustrating a resource area in which PDCCH and PDSCH are set.

FIGS. 12 to 14 are diagrams each illustrating a resource area in which PDCCH and PDSCH are set. In a case where the time duration between the PDCCH and the PDSCH is within a certain time when the Quasi Co Location (QCL) of PDSCH is set by the PDCCH, the base station 100 used to utilize a default QCL (for example, the beam used in the SSB) because there is no time allowed, on the terminal device 200 side, to use the QCL designated by the PDCCH. That is, as illustrated in FIG. 9, when the time interval between PDCCH and PDSCH≤the time offset value, the PDSCH has been received using a default reception environment. Note that QCL is information indicating which reception environment (receiving antenna panel/receiving beam) same as which reference signal should be used.

A more specific example will be described using an example described in 3GPP Rel.15 NR. The slot allocated for the PCSCH is expressed by the following Formula (1).

$$\left[ n \cdot \frac{2^{\mu_{PDSCH}}}{2^{\mu_{PDCCH}}} \right] + K_0 \quad (1)$$

where n is DCI (included in PDCCH) that schedules the PDSCH. $K_0$ is based on PDSCH numerology (e.g. subcarrier spacing). $U_{PDSCH}$ and $U_{PDCCH}$ are subcarrier spacing configurations for PDSCH and PDCCH, respectively. That is, when the UE has received DCI in a certain slot n, the slot of the PDSCH scheduled by the DCI is assigned to the slot represented by Formula (1).

When the time between the reception of the DCI contained in the PDCCH and the corresponding PDSCH (i.e. the time obtained by Formula (1)) is equal to or greater than a threshold timeDurationForQCL, the UE can assume that a reference signal (e.g. SSB or CSI-RS) in a TCI state related to the QCL type given by the TCI state (TCI-State) designated by the RRC layer is quasi-co-located with a Dedicated Modulation Reference Signal (DMRS) of the PDSCH of the serving cell (e.g. PCell or SCell). On the other hand, when the time between the reception of the DCI contained in the PDCCH and the corresponding PDSCH (i.e. the time obtained by Formula (1)) is less than the threshold timeDurationForQCL, it is possible to assume that, in a last slot of one or more Control Resource Sets (CORESETs) among the active BWP of the serving cell monitored by the UE, a reference signal related to the QCL parameter used for the indication of PDCCH quasi co-location of the CORESET associated with the monitored search space with the lowest CORESET ID, is quasi-co-located with the DMRS of the PDSCH of the serving cell (e.g. PCell or SCell).

Furthermore, as a default combination of the receiving antenna panel and the receiving beam for receiving the PDSCH, it is allowable to use the reception environment used for the reception of the PDCCH in a case where a beam such as SSB is provided from a plurality of transmitting antenna panels on the base station 100 side, for example.

Here, FIGS. 13 and 14 illustrate a case where the receiving antenna panel is different between the PDCCH and the PDSCH (FIG. 13) and a case where the receiving antenna panel is the same (FIG. 14). As illustrated in FIGS. 13 and 14, it is preferable to provide different time offset values between the case where there is a need to change the receiving antenna panel to be used when receiving the PDSCH and a case where it is only required to change the receiving beam without the need to change the receiving antenna panel. That is, it is considered that more time would be required to change the receiving beam across different receiving antenna panels than to change only the receiving beam within the same receiving antenna panel.

In view of this, the base station 100 has a plurality of time offset values between the PDCCH and the PDSCH when designating the reception environment (combination of the receiving antenna panel and the receiving beam) to be used in the PDSCH scheduled by the PDCCH.

Specifically, the first time offset value is a value for a case where PDCCH and PDSCH use the same receiving antenna panel and use the same or different receiving beams.

The second time offset value is a value for a case where PDCCH and PDSCH use different receiving antenna panels and use the same or different receiving beams.

For example, each of the time offset values is set so as to satisfy: the second time offset value the first time offset value. The plurality of time offset values is set in advance from the base station 100 to the terminal device 200. That is, the notification unit 141 of the base station 100 notifies the terminal device 200 of the plurality of time offset values. Alternatively, the time offset values may be reported as a capability of the terminal device 200 from the terminal device 200 to the base station device 100.

The designation unit 142 of the base station 100 designates by the PDCCH which time offset value out of the plurality of time offset values is to be used. For example, the designation unit 142 uses one bit of the PDCCH to designate which time offset value out of the plurality of time offset values is to be used. The terminal device 200 receives the designation by the received PDCCH as to which of the first time offset value or the second time offset value is to be used. Accordingly, when the time between the PDCCH and the PDSCH is shorter than the designated time offset value, the terminal device 200 uses the preset default reception environment (combination of the receiving antenna panel and the receiving beam). That is, when the time between PDCCH and PDSCH is shorter than the designated time offset value, the terminal device 200 will use the default reception environment because the setting for the reception environment designated by the PDCCH cannot be made in time. The terminal device 200 will use the reception environment designated by the PDCCH when the time between PDCCH and PDSCH is longer than the designated time offset value.

Figure 15:
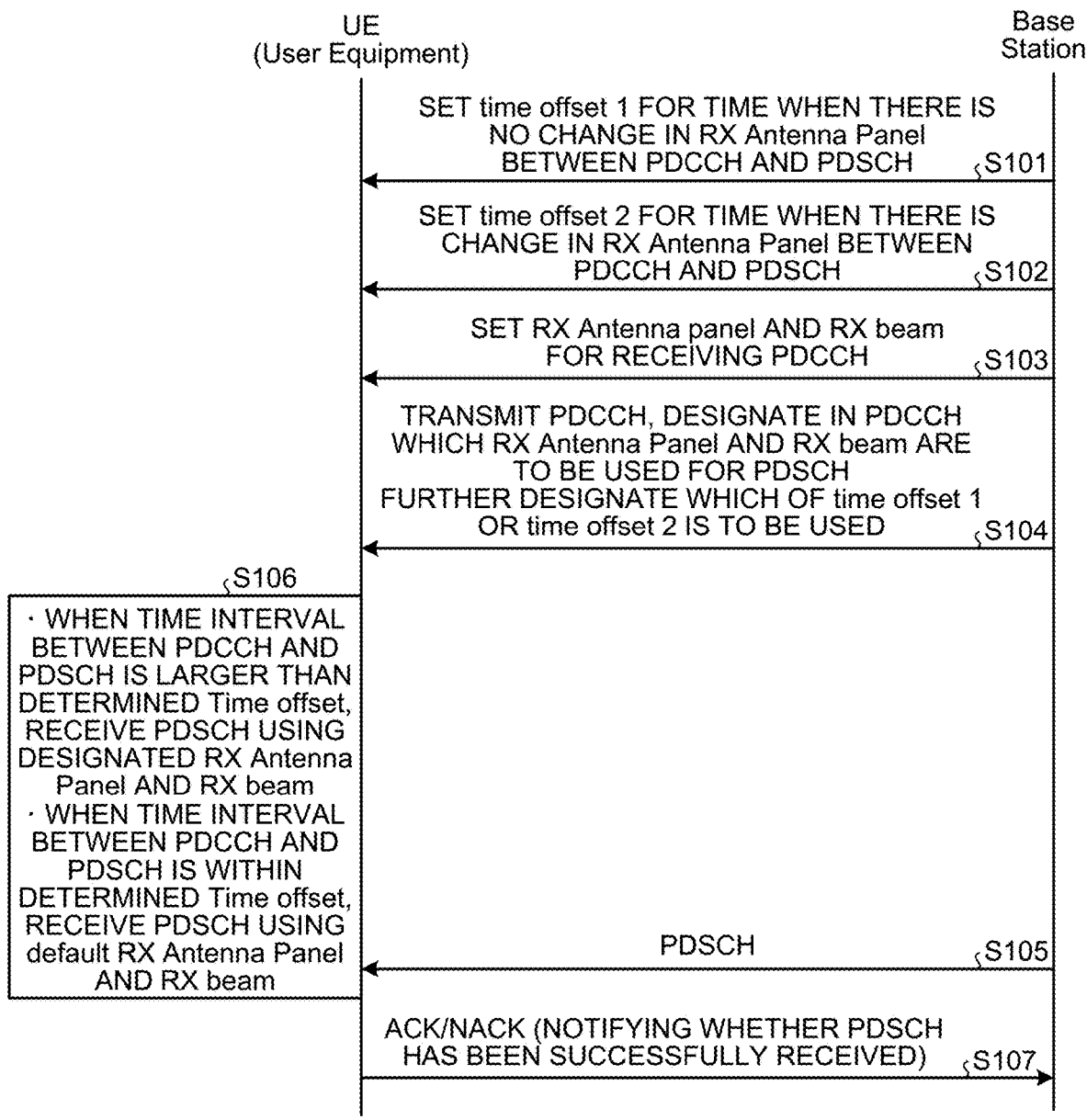
FIG. 15 is a sequence diagram illustrating an example of a flow of a PDSCH reception procedure executed by a base station and a terminal device.

FIG. 15 is a sequence diagram illustrating an example of a flow of a PDSCH reception procedure executed by the base station 100 and the terminal device 200. As illustrated in FIG. 15, the base station 100 sets the first time offset value when there is no change in the receiving antenna panel between the PDCCH and the PDSCH onto the terminal device 200 (step S101).

Subsequently, the base station 100 sets the second time offset value when there is a change in the receiving antenna panel between the PDCCH and the PDSCH onto the terminal device 200 (step S102). Subsequently, the base station 100 sets the receiving antenna panel and the receiving beam for receiving the PDCCH onto the terminal device 200 (step S103).

Subsequently, the base station 100 designates, in the PDCCH to be transmitted, the receiving antenna panel and the receiving beam to be used by the PDSCH, further designates the time offset value, and then transmits the PDCCH (step S104).

Subsequently, the base station 100 transmits the PDSCH using the resource area designated by the PDCCH (step S105).

Subsequently, the terminal device 200 receives the PDSCH using the receiving antenna panel and the receiving beam designated by the PDCCH when the time interval between the PDCCH and the PDSCH is longer than the set time offset value (step S106). Alternatively, the terminal device 200 receives the PDSCH using the default receiving antenna panel and receiving beam when the time interval between the PDCCH and PDSCH is shorter than the set time offset value (step S106).

Subsequently, the terminal device 200 notifies the base station 100 whether the PDSCH has been successfully received (step S107).

In this manner, it is possible to set the time offset value corresponding to the case where the receiving antenna panel is switched and the case where the receiving antenna panel is not switched. Therefore, regarding the reception environment used when receiving PDSCH, it is possible to increase the situations in which reception environment designated in the Downlink Control Information (DCI) as much as possible.

While the above has described the process used when the base station 100 determines whether the receiving antenna panels to be used for the PDCCH and the PDSCH are the same, this process is based on a premise that the base station 100 has the knowledge that the receiving antenna panel is the same for the PDCCH and the PDSCH. This leads to an assumption that the base station 100 has already set the receiving antenna panel to be used for the PDCCH, and can perform scheduling of the PDSCH in the PDCCH and designation of the receiving antenna panel and the receiving beam to be used.

Here, it is also assumed that the base station 100 has no knowledge whether the receiving antenna panels for the PDCCH and PDSCH are the same. For example, when the receiving antenna panel and receiving beam to be used for PDCCH reception have not been set, there is no way to inform the terminal device 200 which one to use as the default for the receiving antenna panel and receiving beam to be used for PDSCH reception. Specifically, the terminal device 200 receives the PDCCH by using the default of the PDCCH. In a case, however, where the base station 100 has no grasp of the content of the default and only the terminal device 200 grasps the content, the base station 100 would have no knowledge which receiving antenna panel has been used for the PDCCH. In that case, it would not be possible to designate from the base station 100 whether to use the first time offset value or the second time offset value.

Therefore, when the base station 100 cannot determine whether the receiving antenna panels are the same, the terminal device 200 determines on its own whether the receiving antenna panels are the same.

Specifically, the terminal device 200 determines whether the PDSCH reception environment designated in the PDCCH and the reception environment actually used for the PDCCH are the same. When it is determined that they are the same, the terminal device 200 uses the first time offset value described above. In contrast, the terminal device 200 uses the above-described second time offset value when the reception environment of the PDCCH and the reception environment of the PDSCH are different. For example, the determination unit 241 of the terminal device 200 acquires environment information indicating whether the reception environments for the PDCCH and the PDSCH are the same. Specifically, the determination unit 241 acquires 1-bit environment information in the PDCCH indicating whether the reception environment of the PDCCH and the reception environment of the PDSCH are the same.

Here, the time required for the reception process in the terminal device 200 will be described. The time offset value is a value that is set in advance from the base station 100 to the terminal device 200 or that is reported as the capability of the terminal device 200 from the terminal device 200 to the base station device 100. For example, the value may be timeDurationForQCL in the case of 3GPP Re1.15 NR. The value timeDurationForQCL has different candidate values that the UE can set for each of Subcarrier Spacings. When Subcarrier Spacing is 60 kHz, one of 7 OFDM symbols, 14 OFDM symbols, and 28 OFDM symbols are to be set. When Subcarrier Spacing is 120 kHz, either 14 OFDM symbols or 28 OFDM symbols are to be set. As another example, the time offset value can be set as an integer such as N with the time required for 10 OFDM symbols defined in a unit time. On the other hand, the time between PDCCH and PDSCH is expressed by the above Formula (1) in the case of 3GPP Re1.15 NR, for example. As another example, the time may be calculated as follows. The time may be written in the information regarding the scheduling of the PDSCH in the content of the PDCCH (predicted arrival time and frequency of PDSCH, etc.) which can be viewed by the terminal device 200 by decoding the PDCCH received. That is, the terminal device 200 may be configured to be able to obtain the relative time difference between the PDCCH and the PDSCH at a point of decoding and viewing the scheduling information. Thereafter, by comparing the size of the acquired relative arrival time difference with the preset time offset value, the terminal device 200 determines the reception environment (combination of the receiving antenna panel and the receiving beam to be used for reception). In each of the above processes, there is no need to measure the actual processing time of the terminal device 200, and the relative time difference between the PDCCH and the PDSCH is calculated with reference to the scheduling information of the PDCCH. In some cases, the relative arrival time difference can be grasped by the number of OFDM symbols in one slot, and in other cases, it can be grasped as the time difference corresponding to the number of OFDM symbols spanning a plurality of slots. While the time offset value is determined in advance according to the actual processing capability of the terminal device 200, it is preferable that the time offset value can be changed due to variable processing speed of the terminal device 200.

Figure 16:
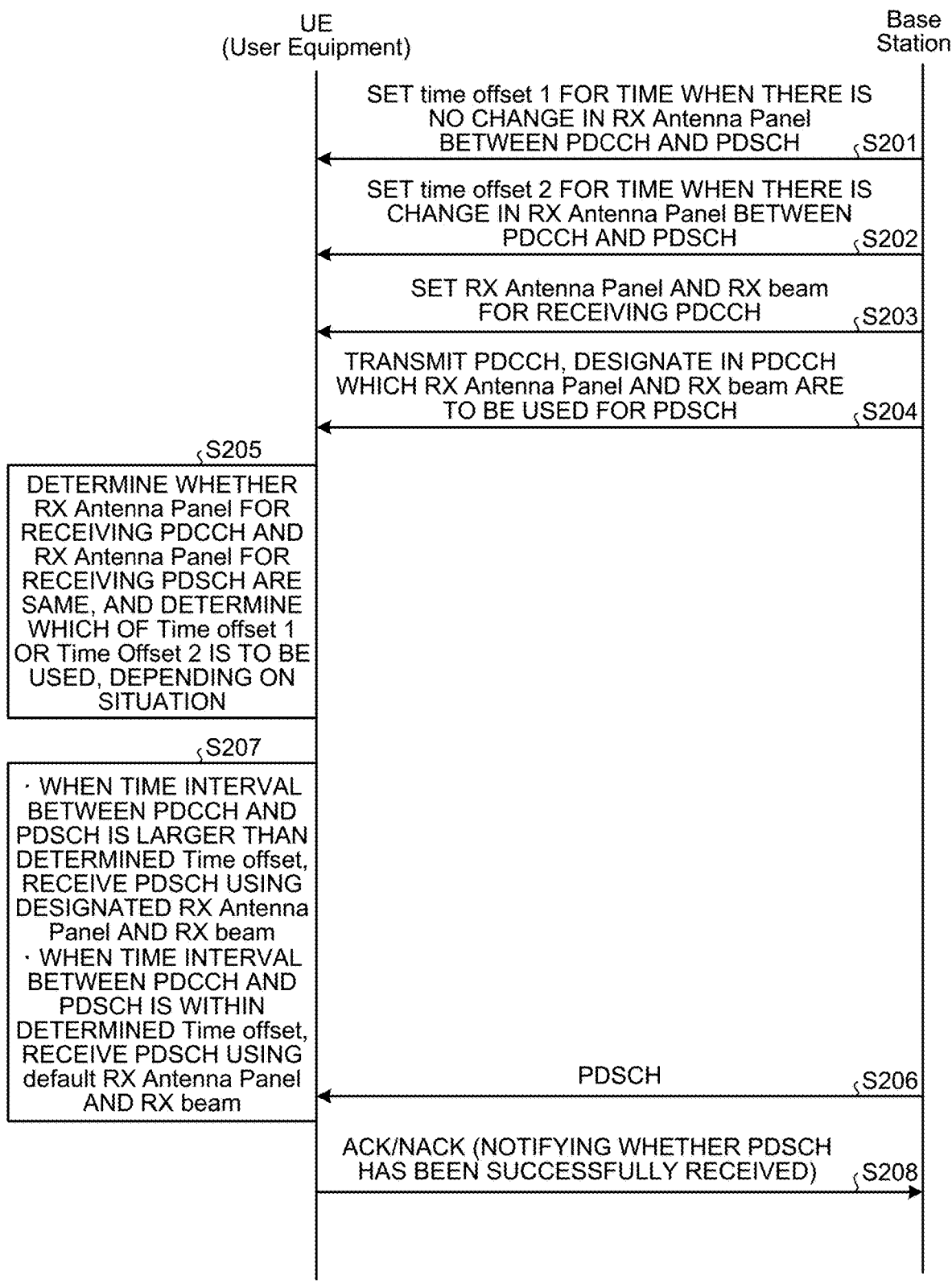
FIG. 16 is a sequence diagram illustrating an example of a flow of a PDSCH reception procedure executed by a base station and a terminal device.

FIG. 16 is a sequence diagram illustrating an example of a flow of the PDSCH reception procedure executed by the base station 100 and the terminal device 200. As illustrated in FIG. 16, the notification unit 141 of the base station 100 sets the first time offset value for the time when there is no change in the receiving antenna panel between PDCCH and PDSCH onto the terminal device 200 (step S201).

Subsequently, the notification unit 141 of the base station 100 sets the second time offset value when the receiving antenna panel changes between the PDCCH and the PDSCH in the terminal device 200 (step S202). Subsequently, the designation unit 142 of the base station 100 sets the receiving antenna panel and the receiving beam for receiving the PDCCH onto the terminal device 200 (step S203).

Subsequently, the designation unit 142 of the base station 100 designates, in the PDCCH to be transmitted, the receiving antenna panel and the receiving beam to be used by the PDSCH and transmits the PDCCH (step S204).

Next, the selection unit 242 of the terminal device 200 selects the time offset value based on the determination result of whether the reception environment of the PDCCH and the reception environment of the PDSCH designated by the PDCCH are the same, and then, the setting unit 243 sets the selected time offset value (step S205).

Subsequently, the base station 100 transmits the PDSCH in a resource area designated by the PDCCH (step S206).

Subsequently, when the time interval between the PDCCH and the PDSCH is longer than the set time offset value, the setting unit 243 of the terminal device 200 receives the PDSCH using the receiving antenna panel and the receiving beam designated by the PDCCH (step S207). Alternatively, the setting unit 243 of the terminal device 200 receives the PDSCH using the default receiving antenna panel and the receiving beam when the time interval between the PDCCH and the PDSCH is shorter than the set time offset value (step S207).

Subsequently, the terminal device 200 notifies the base station 100 whether the PDSCH has been successfully received (step S208).

With this procedure, it is possible to set an appropriate time offset value even when only the terminal device 200 grasps whether the receiving antenna panels used for the PDCCH and PDSCH are the same. This leads to a higher possibility that the receiving antenna panel designated by the base station 100 can be used for receiving the PDSCH.

In the above, it is assumed that the terminal device 200 receives the PDCCH in the reception environment designated by the base station 100. However, for example, in a case where the default reception environment for receiving the PDCCH (combination of the receiving antenna panel and the receiving beam) is used, the selection unit 242 of the terminal device 200 uses the third time offset value regardless of whether the receiving antenna panels to be used for the PDSCH are the same. For example, the third time offset value may be set in advance by the base station 100, or may be predetermined by a standard or the like. Furthermore, the third time offset value is preferably the first time offset value and the second time offset value or more, for example.

This eliminates the necessity for the terminal device 200 to perform the determination process of whether the reception environments of the PDCCH and the PDSCH are the same, making it possible to simplify the operation of the terminal device 200 and reduce the processing load.

Incidentally, while the setting unit 243 of the terminal device 200 receives the PDSCH in the default reception environment when the time interval is less than the set time offset value, the default reception environment (combination of the receiving antenna panel and the receiving beam) to be used is the environment that has been set in advance. Therefore, it is assumed to have a case where the default reception environment differs from the reception environment (combination of the receiving antenna panel and the receiving beam) that should actually be used for PDSCH.

Therefore, the setting unit 243 of the terminal device 200 uses the reception environment (combination of the receiving antenna panel and the receiving beam) used for the actual reception of the PDCCH that has scheduled the PDSCH, as a default.

This makes it possible to reduce the possibility of occurrence of a processing failure as compared with the case where the preset reception environment is used as the default. That is, it is possible to increase the possibility of receiving the PDSCH.

In the above description, a plurality of time offset values is switched depending on whether the receiving antenna panel is switched at the reception of the PDCCH and PDSCH. Alternatively, the plurality of time offset values may be switched depending on whether the resource areas for PDSCHs overlap each other, for example. This point will be described with reference to FIG. 17.

Figure 17:
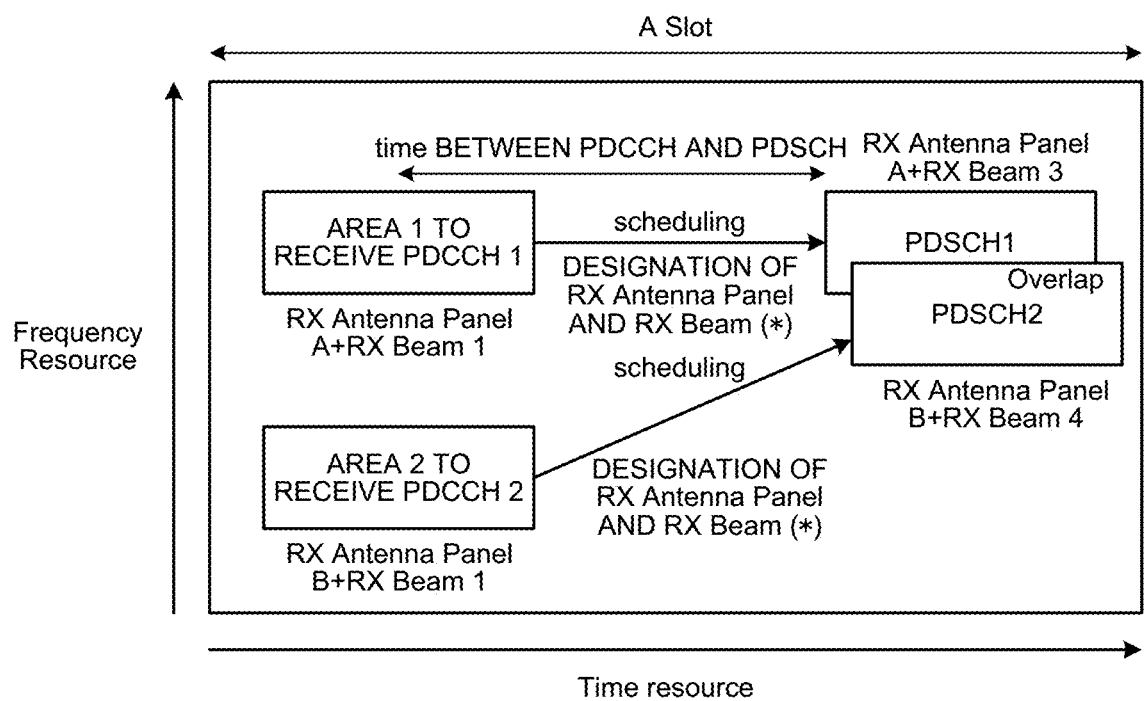
FIG. 17 is a diagram illustrating a case where resource areas for a plurality of PDSCHs overlap each other.

FIG. 17 is a diagram illustrating a case where resource areas for a plurality of PDSCHs overlap each other. As illustrated in FIG. 17, when PDSCH 1 and PDSCH 2 are scheduled by PDCCH 1 and PDCCH 2 in the frequency domain and time domain that overlap at the same time, the terminal device 200 will use the receiving antenna panel and receiving beam designated by the PDCCH 1 for not merely reception of the PDSCH 1 but also for the reception of the PDSCH 2. Therefore, the processing load required for switching the receiving antenna panel and the receiving beam of the terminal device 200 differs depending on whether PDSCH 1 and PDSCH 2 overlap each other. Accordingly, it is preferable to change the time offset value depending on whether the resource areas for a plurality of PDSCHs overlap with each other.

In view of this, a new time offset value is provided for a case where a plurality of PDSCHs overlaps each other. For example, the selection unit 242 of the terminal device 200 sets the time offset according to the bit information indicating whether the PDSCHs in the PDCCH overlap each other. Specifically, the designation unit 142 of the base station 100 prepares one bit (equivalent to the overlap information) in the PDCCH (e.g. DCI) indicating whether the PDSCH being scheduled overlaps with another PDSCH. The selection unit 242 of the terminal device 200 sets the time offset value based on the content of such one bit. Thereafter, the setting unit 243 of the terminal device 200 compares the set time offset value with the time interval between the PDCCH and the PDSCH, and then, receives the PDSCH under the preset default reception environment in a case where the time interval is less than the time offset. The default may be the reception environment used for receiving the PDCCH. This has the advantage that the load on the terminal device 200 is lower than the case where the terminal device 200 recognizes the overlapping from the scheduling information (e.g. DCI) in the PDCCH.

Figure 18:
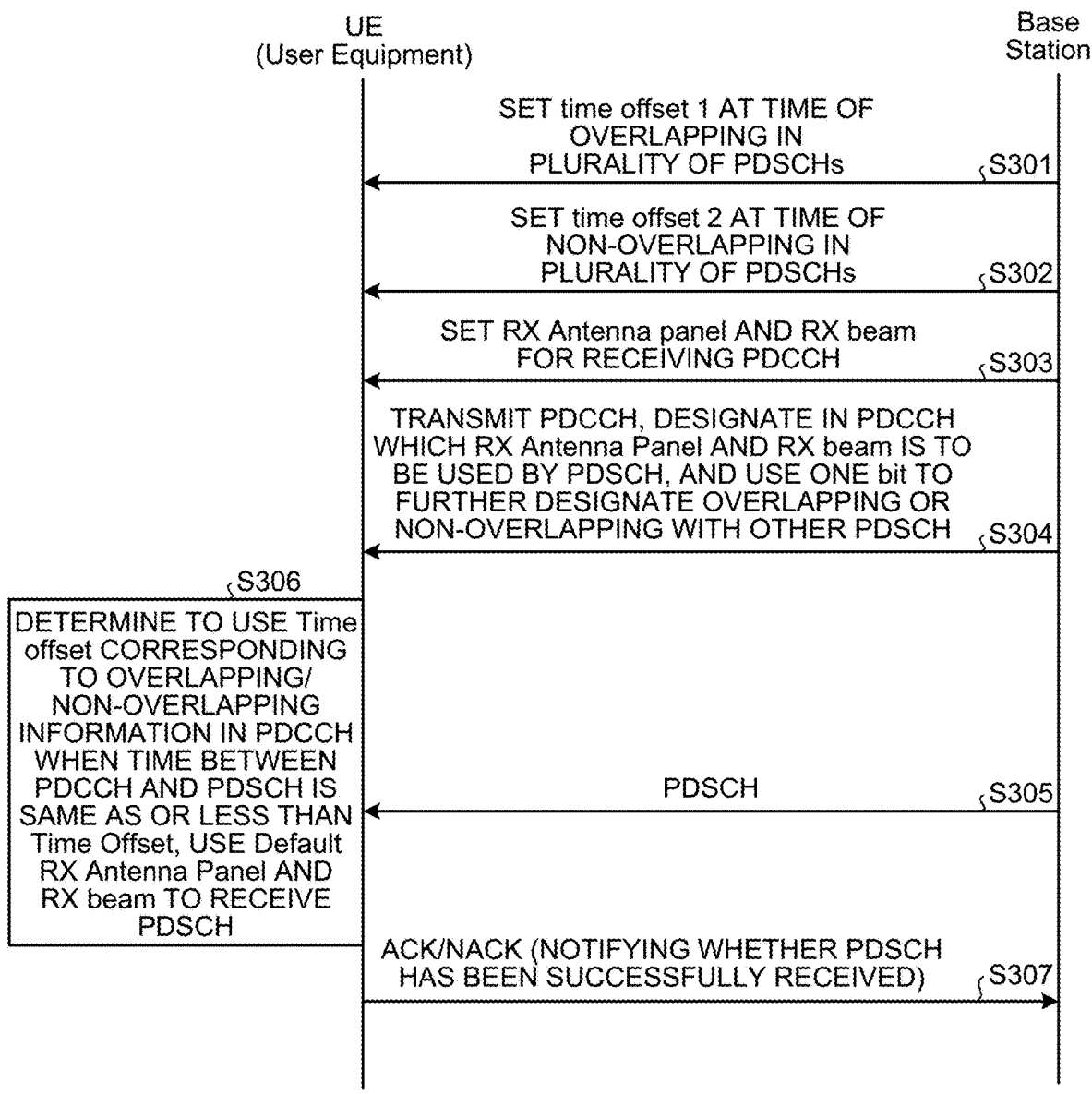
FIG. 18 is a sequence diagram illustrating an example of a flow of a PDSCH reception procedure executed by a base station and a terminal device.

FIG. 18 is a sequence diagram illustrating an example of a flow of the PDSCH reception procedure executed by the base station 100 and the terminal device 200. As illustrated in FIG. 18, the notification unit 141 of the base station 100 sets the time offset value (second time offset value) when a plurality of PDSCHs overlaps each other, onto the terminal device 200 (step S301).

Subsequently, the notification unit 141 of the base station 100 sets the time offset value (first time offset value) when the plurality of PDSCHs does not overlap each other, onto the terminal device 200 (step S302). Subsequently, the designation unit 142 of the base station 100 sets the receiving antenna panel and the receiving beam for receiving the PDCCH, onto the terminal device 200 (step S303).

Next, the designation unit 142 of the base station 100 designates, in the PDCCH to be transmitted, the receiving antenna panel and the receiving beam to be used for the PDSCH. Thereafter, having designated whether the PDSCH overlaps with another PDSCH in one bit, the designation unit 142 transmits the PDCCH (step S304).

Subsequently, the base station 100 transmits the PDSCH in the resource area designated by the PDCCH (step S305).

Subsequently, the selection unit 242 of the terminal device 200 determines the time offset value in advance based on the one bit indicating whether there is overlapping in the PDCCH, and the setting unit 243 receives the PDSCH using the reception environment determined based on the result of comparison between the time offset value and the time interval between the PDCCH and the PDSCH (step S306).

Subsequently, the terminal device 200 notifies the base station 100 whether the PDSCH has been successfully received (step S307).

In this manner, the time offset value can be changed depending on whether a plurality of PDSCHs overlaps each other. This makes it possible to correctly estimate the load associated with switching the reception environment on the terminal device 200 side, leading to accurate determination of whether the switching will be in time.

4. Application Examples

<4.1. Examples of Application to NR in 3GPP Standard>

Subsequently, an example when the above-described embodiment is applied to NR in 3GPP standard will be described. When having received a UE Capability Enquiry from the NGRAN (base station 100), the UE (terminal device 200) transmits UE Capability Information to the NGRAN. The UE Capability Information includes Feature-SetDownlink IE as part of the UE capability. In NR of Rel.15, FeatureSetDownlink includes timeDurationForQCL described above. However, timeDurationForQCL does not consider the receiving antenna panel to be used by the UE to receive the PDSCH. In view of this, in this example of application, a plurality of IEs corresponding to the above-described first time offset value and the second time offset value is newly defined. Examples of these are timeDurationType1ForQCL IE and timeDurationType2ForQCL IE. The timeDurationType1ForQCL IE may contain the same values as the timeDurationForQCL IE described above, or may have the same information (i.e. timeDurationForQCL may be referred to as timeDurationType1ForQCL). That is, when Subcarrier Spacing is 60 kHz, one of 7 OFDM symbols, 14 OFDM symbols, or 28 OFDM symbols may be set; when Subcarrier Spacing is 120 kHz, one of 14 OFDM symbols or 28 OFDM symbols may be set. Meanwhile, timeDurationType2ForQCL IE corresponds to the above-described second time offset value. Therefore, it is desirable to be able to set a longer time than timeDurationType1ForQCL. For example, for timeDurationType2ForQCL IE, one of 14 OFDM symbols, 28 OFDM symbols, or 42 OFDM symbols may be set when Subcarrier Spacing is 60 kHz; one of 28 OFDM symbols or 42 OFDM symbols may be set when Subcarrier Spacing is 120 kHz. In this example of application, the UE transmits timeDurationType1ForQCL IE and timeDurationType2ForQCL IE included in the UE Capability Information.

The UE receives the PDCCH in a certain time slot n of a certain Active BWP in a certain serving cell. The PDCCH contains DCI for scheduling the PDSCH. Furthermore, in this example of application, the DCI includes information (e.g. index) indicating whether timeDurationType1ForQCL or timeDurationType2ForQCL should be used. Based on the above Formula (1), the UE specifies the slot to which the PDSCH is assigned.

Here, the UE operates as follows. When the DCI contained in the PDCCH indicates whether timeDurationType1ForQCL or timeDurationType2ForQCL should be used, and when the time (i.e. the time calculated by Formula (1)) between the reception of the DCI contained in the PDCCH and the corresponding PDSCH is equal to or greater than a threshold timeDurationType1ForQCL or timeDurationType2ForQCL indicated by the DCI, the UE can assume that the reference signal (e.g. SSB or CSI-RS) in a TCI state regarding the QCL type given by the TCI state (TCI-State) designated by the RRC layer is quasi-co-located with a Dedicated demodulation Reference Signal (DMRS) of the PDSCH of the serving cell (e.g. PCell or SCell). In contrast, when the DCI contained in the PDCCH indicates whether timeDurationType1ForQCL or timeDurationType2ForQCL should be used, and when the time (i.e. the time obtained by Formula (1)) between the reception of the DCI contained in the PDCCH and the corresponding PDSCH is less than the threshold timeDurationType1ForQCL or the threshold timeDurationType2ForQCL, indicated by the DCI, it is possible to assume that, in a last slot of one or more Control Resource Sets (CORESETs) in the active BWP of the serving cell monitored by the UE, a reference signal related to the QCL parameter used for the indication of PDCCH quasi co-location of the CORESET associated with the monitored search space with the lowest CORESET ID, is quasi-co-located with the DMRS of the PDSCH of the serving cell (e.g. PCell or SCell).

Thereafter, the UE receives the PDSCH using a combination of the receiving antenna panel and the receiving beam (a combination of one or more antenna ports and the received reference signal) which has been assumed to be quasi co-location.

Furthermore, the technology according to the present disclosure is applicable to various products.

For example, the base station 100 may be any of eNodeB, ng-eNodeB, gNodeB, or en-gNodeB as described above. In addition to or instead of this, the base station 100 may be referred to as EUTRAN when the base station 100 is either eNodeB or en-gNodeB. In addition to or instead of this, the base station 100 may be referred to as NGRAN when the base station 100 is either gNodeB or ng-eNodeB. Furthermore, the base station 100 may be a Master Node (MN) or a Secondary Node (SN) in Dual Connectivity. That is, the base station 100 may be a Secondary gNodeB in the case of EUTRA-NR Dual Connectivity or in the case of NR-NR Dual Connectivity. In this case, a part or all of the above-described RRC signaling may be transmitted to and received from the UE (terminal device 200) via the MN, or may be directly transmitted or received between the UE (terminal device 200) and a secondary gNodeB (base station 100) via a Signaling Radio Bearer (SRB) 3. The above-described PDCCH and PDSCH may be transmitted in a Secondary Cell Group (SCG) between the UE (terminal device 200) and the secondary gNodeB (base station 100). In addition to or instead of this, the base station 100 may be a Master gNodeB in the case of NR-EUTRA Dual Connectivity or in the case of NR-NR Dual Connectivity. In this case, the above-described RRC signaling may be transmitted or received between the UE (terminal device 200) and the Master gNodeB (base station 100) via any of SRBs 0 to 2. The above-described PDCCH and PDSCH may be transmitted in a master Cell Group (MCG) between the UE (terminal device 200) and the Master gNodeB (base station 100). In addition to or instead of this, the above-described base station 100 may be a gNB Central Unit (gNB-CU) or a gNB Distributed Unit (gNB-DU) or a combination of gNB-CU and gNB-DU (i.e. gNB). The gNB-CU hosts the RRC layer, SDAP layer, and PDCP layer for a certain UE. On the other hand, gNB-DU hosts the RLC layer, MAC layer, and PHY layer for a certain UE. That is, a part or all of the above-described RRC signaling may be terminated between the UE and gNB-CU via gNB-DU. A part or all of the downlink RRC signaling may be generated by gNB-CU. On the other hand, the above-described PDCCH and PDSCH may be generated by gNB-DU and transmitted to the UE. In addition to or instead of this, the base station 100 may be implemented as a macro eNB, a small eNB, or the like. The small eNB may be an eNB that covers cells smaller than the macro cell, such as a pico eNB, a micro eNB, or a home (femto) eNB. In addition to or instead of this, the base station 100 may be implemented as other types of base station such as Node B or a Base Transceiver Station (BTS). The base station 100 may include a main body (also referred to as a base station device) that controls radio communication, and one or more Remote Radio Heads (RRHs) arranged at a location different from the main body. Furthermore, various types of terminals, which will be described below, may operate as the base station 100 by temporarily or semi-permanently executing the base station function.

Furthermore, for example, the terminal device 200 may be implemented as a mobile terminal such as a smartphone, a tablet Personal Computer (PC), a notebook PC, a portable game terminal, a portable/dongle type mobile router, and a digital camera, or as an in-vehicle terminal such as a car navigator. Furthermore, the terminal device 200 may be implemented as a terminal (also referred to as a Machine Type Communication (MTC) terminal) that performs Machine To Machine (M2M) communication. Furthermore, the terminal device 200 may be a radio communication module (for example, an integrated circuit module formed of one die) mounted on these terminals.

<4.2. Application Examples Related to Base Station>

First Application Example

Figure 19:
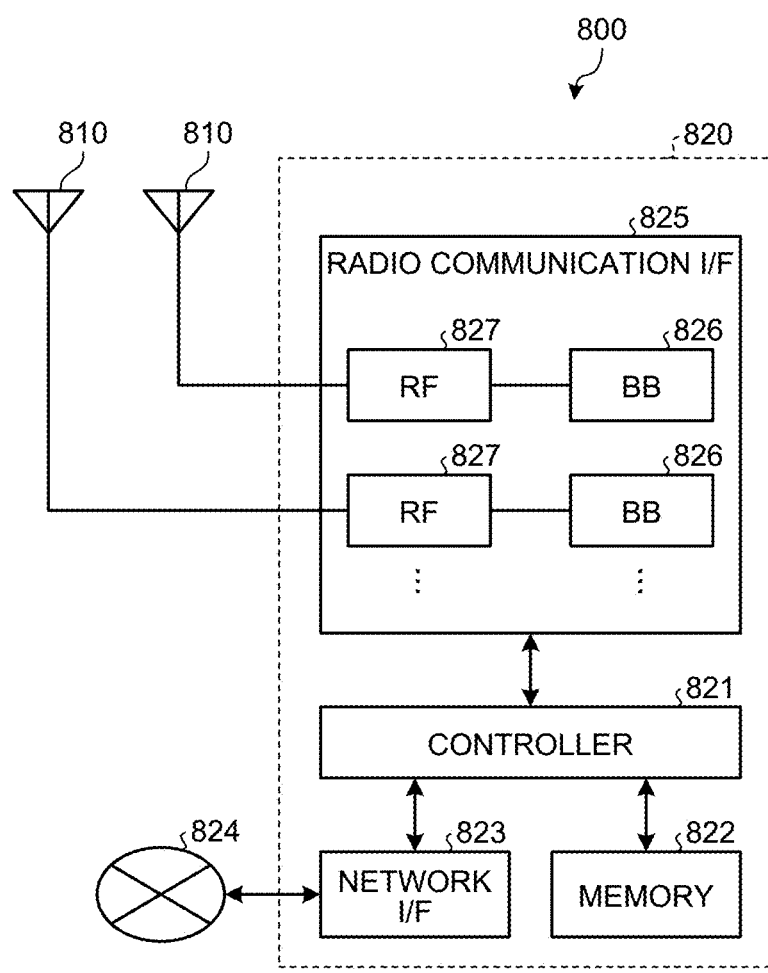
FIG. 19 is a block diagram illustrating a first example of a schematic configuration of a gNB to which the technology according to the present disclosure is applicable.

FIG. 19 is a block diagram illustrating a first example of a schematic configuration of a gNB to which the technology according to the present disclosure is applicable. A gNB 800 has one or more antennas 810 and a base station device 820. Each of the antennas 810 and the base station device 820 may be connected to each other via an RF cable. The technique of the present disclosure may be applied to eNB instead of gNB.

Each of the antennas 810 has a single or a plurality of antenna elements (for example, a plurality of antenna elements constituting a MIMO antenna) and is used for transmission and reception of radio signals by the base station device 820. The gNB 800 has a plurality of antennas 810 as illustrated in FIG. 19, and the plurality of antennas 810 may each correspond to a plurality of frequency bands used by the gNB 800, for example. Although FIG. 19 illustrates an example in which the gNB 800 has the plurality of antennas 810, the gNB 800 may have a single antenna 810.

The base station device 820 includes a controller 821, memory 822, a network interface 823, and a radio communication interface 825.

The controller 821 may be a CPU or DSP, for example, and controls operation of various functions of an upper layer of the base station device 820. For example, the controller 821 generates a data packet from the data in the signal processed by the radio communication interface 825 and transfers the generated packet via the network interface 823. The controller 821 may generate a bundled packet by bundling data from a plurality of baseband processors and transfer the generated bundled packet. In addition, the controller 821 may include logical functions that execute controls such as radio resource control, radio bearer control, mobility management, admission control, or scheduling. Furthermore, the control may be executed in cooperation with surrounding gNBs or core network nodes. The memory 822 includes RAM and ROM, and stores a program executed by the controller 821 and various types of control data (for example, terminal list, transmission power data, and scheduling data)

The network interface 823 is a communication interface for connecting the base station device 820 to a core network 824. The controller 821 may communicate with a core network node or other gNBs via the network interface 823. In that case, the gNB 800 may be connected to the core network node or other gNBs to each other by a logical interface (for example, an S1 interface or an X2 interface). The network interface 823 may be a wired communication interface or a radio communication interface for a radio backhaul. When the network interface 823 is a radio communication interface, the network interface 823 may use a frequency band higher than the frequency band used by the radio communication interface 825, for radio communication.

The radio communication interface 825 supports a cellular communication scheme such as NR, LTE, or LTE-Advanced, and provides a radio connection to terminals located in cells of gNB 800 via the antenna 810. The radio communication interface 825 can typically include a baseband (BB) processor 826, RF circuit 827, or the like. The BB processor 826 may perform, for example, encoding/decoding, modulation/demodulation, and multiplexing/demultiplexing, and executes various types of signal processing in individual layers (for example, L1, Medium Access Control (MAC), Radio Link Control (RLC), and Packet Data Convergence Protocol (PDCP)). The BB processor 826 may include some or all of the above-described logical functions instead of the controller 821. The BB processor 826 may be a module including: memory for storing a communication control program; a processor for executing the program; and related circuits. The functions of the BB processor 826 may be modified by updating the above program. Furthermore, the module may be a card or a blade inserted into a slot of the base station device 820, or may be a chip mounted on the card or the blade. The RF circuit 827 may include a mixer, a filter, an amplifier, or the like, and transmits and receives radio signals via the antenna 810.

The radio communication interface 825 may include a plurality of BB processors 826 as illustrated in FIG. 19, and the plurality of BB processors 826 may each correspond to a plurality of frequency bands used by the gNB 800, for example. Furthermore, the radio communication interface 825 may include a plurality of RF circuits 827 as illustrated in FIG. 19, and the plurality of RF circuits 827 may each correspond to a plurality of antenna elements, for example. Although FIG. 19 illustrates an example in which the radio communication interface 825 includes a plurality of BB processors 826 and a plurality of RF circuits 827, the radio communication interface 825 may include a single BB processor 826 or a single RF circuit 827.

In the gNB 800 illustrated in FIG. 19, one or more components included in the control unit 140 described with reference to FIG. 10 may be implemented in the radio communication interface 825. Alternatively, at least some of these components may be implemented in the controller 821. As an example, the gNB 800 may be equipped with a module including a part or all of the radio communication interface 825 (for example, the BB processor 826) and/or the controller 821, and the module may be equipped with one or more of the above components. In this case, the module may store a program for causing the processor to function as the one or more components (in other words, a program for causing the processor to perform the operation of the one or more components) and may execute the program. As another example, the program causing the processor to function as the one or more of the above components may be installed in the gNB 800, and the radio communication interface 825 (for example, the BB processor 826) and/or the controller 821 may execute the program. As described above, the eNB 800, the base station device 820, or the above module may be provided as a device including the one or more components, and a program for causing the processor to function as the one or more components may be provided. Furthermore, a readable recording medium on which the above program is recorded may be provided.

Furthermore, in the gNB 800 illustrated in FIG. 19, the communication unit 120 described with reference to FIG. 10 may be implemented in the radio communication interface 825 (for example, the RF circuit 827). Furthermore, the antenna unit 110 may be implemented in the antenna 810. Furthermore, the storage unit 130 may be implemented in the memory 822.

Second Application Example

Figure 20:
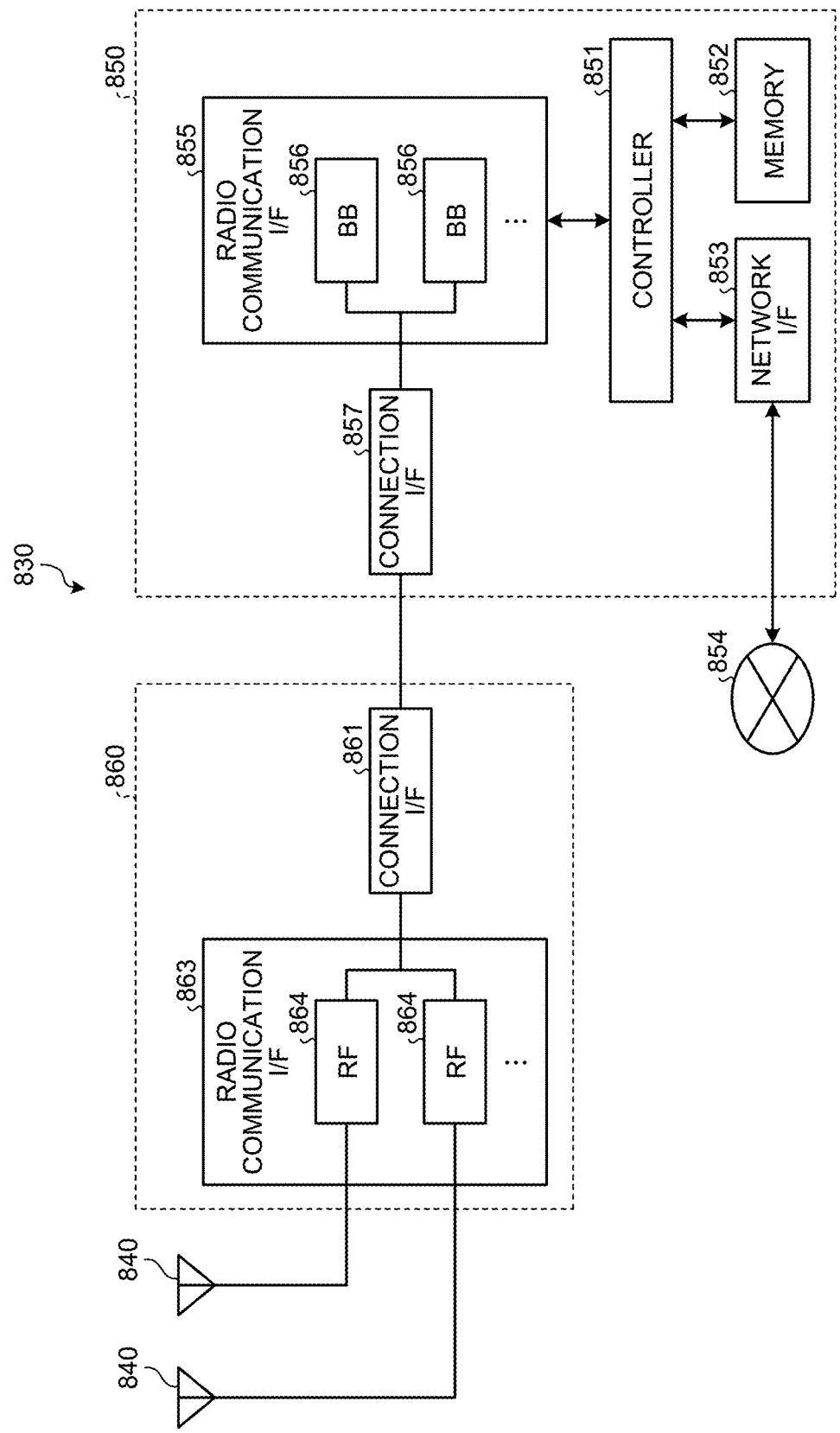
FIG. 20 is a block diagram illustrating a second example of a schematic configuration of a gNB to which the technology according to the present disclosure is applicable.

FIG. 20 is a block diagram illustrating a second example of a schematic configuration of a gNB to which the technology according to the present disclosure is applicable. A gNB 830 has one or more antennas 840, a base station device 850, and a gNB-DU 860. Each of the antennas 840 and the gNB-DU 860 may be connected to each other via an RF cable. Furthermore, the base station device 850 and the gNB-DU 860 can be connected to each other by a high-speed line such as an optical fiber cable. Incidentally, in a case where the technology of the present disclosure will be applied to eNB instead of gNB, the gNB-DU 860 will be replaced with RRH.

Each of the antennas 840 has a single or a plurality of antenna elements (for example, a plurality of antenna elements constituting a MIMO antenna) and is used for transmission and reception of radio signals by the gNB-DU 860. The gNB 830 has a plurality of antennas 840 as illustrated in FIG. 20, and the plurality of antennas 840 may each correspond to a plurality of frequency bands used by the gNB 830, for example. Although FIG. 20 illustrates an example in which the gNB 830 has the plurality of antennas 840, the gNB 830 may have a single antenna 840.

The base station device 850 includes a controller 851, a memory 852, a network interface 853, a radio communication interface 855, and a connection interface 857. The controller 851, the memory 852, and the network interface 853 are similar to the controller 821, memory 822, and network interface 823 described with reference to FIG. 20, respectively.

The radio communication interface 855 supports a cellular communication scheme such as NR, LTE, or LTE-Advanced, and provides a radio connection to terminals located in the sector corresponding to the gNB-DU 860 via the gNB-DU 860 and the antenna 840. The radio communication interface 855 can typically include a BB processor 856 or the like. The BB processor 856 is similar to the BB processor 826 described with reference to FIG. 19, except that connection to an RF circuit 864 of the gNB-DU 860 is made via the connection interface 857. The radio communication interface 855 may include a plurality of BB processors 856 as illustrated in FIG. 20, and the plurality of BB processors 856 may each correspond to a plurality of frequency bands used by the gNB 830, for example. Although FIG. 20 illustrates an example in which the radio communication interface 855 includes a plurality of BB processors 856, the radio communication interface 855 may include a single BB processor 856.

The connection interface 857 is an interface for connecting the base station device 850 (radio communication interface 855) to the gNB-DU 860. The connection interface 857 may be a communication module for communication over the high-speed line connecting the base station device 850 (radio communication interface 855) and the gNB-DU 860.

The gNB-DU 860 also includes a connection interface 861 and a radio communication interface 863.

The connection interface 861 is an interface for connecting the gNB-DU 860 (radio communication interface 863) to the base station device 850. The connection interface 861 may be a communication module for communication over the high-speed line.

The radio communication interface 863 transmits and receives radio signals via the antenna 840. The radio communication interface 863 can typically include the RF circuit 864 or the like. The RF circuit 864 may include a mixer, a filter, an amplifier, or the like, and transmits and receives radio signals via the antenna 840. The radio communication interface 863 includes a plurality of RF circuits 864 as illustrated in FIG. 20, and the plurality of RF circuits 864 may each correspond to a plurality of antenna elements, for example. Although FIG. 20 illustrates an example in which the radio communication interface 863 includes a plurality of RF circuits 864, the radio communication interface 863 may include a single RF circuit 864.

In the gNB 830 illustrated in FIG. 20, one or more components included in the control unit 140 described with reference to FIG. 10 may be implemented in the radio communication interface 855 and/or the radio communication interface 863. Alternatively, at least some of these components may be implemented in the controller 851. As an example, the gNB 830 may be equipped with a module including a part or all of the radio communication interface 855 (for example, the BB processor 856) and/or the controller 851, and the module may be equipped with one or more of the above components. In this case, the module may store a program for causing the processor to function as the one or more components (in other words, a program for causing the processor to perform the operation of the one or more components) and may execute the program. As another example, the program causing the processor to function as the one or more of the above components may be installed in the gNB 830, and the radio communication interface 855 (for example, the BB processor 856) and/or the controller 851 may execute the program. As described above, the gNB 830, the base station device 850, or the above module may be provided as a device including the one or more components, and a program for causing the processor to function as the one or more components may be provided. Furthermore, a readable recording medium on which the above program is recorded may be provided.

Furthermore, in the gNB 830 illustrated in FIG. 20, the communication unit 120 described with reference to FIG.

10, for example, may be implemented in the radio communication interface 863 (for example, the RF circuit 864). Furthermore, the antenna unit 110 may be implemented in the antenna 840. Furthermore, the storage unit 130 may be implemented in the memory 852.

<4.3. Application Examples Related to Terminal Devices>

First Application Example

Figure 21:
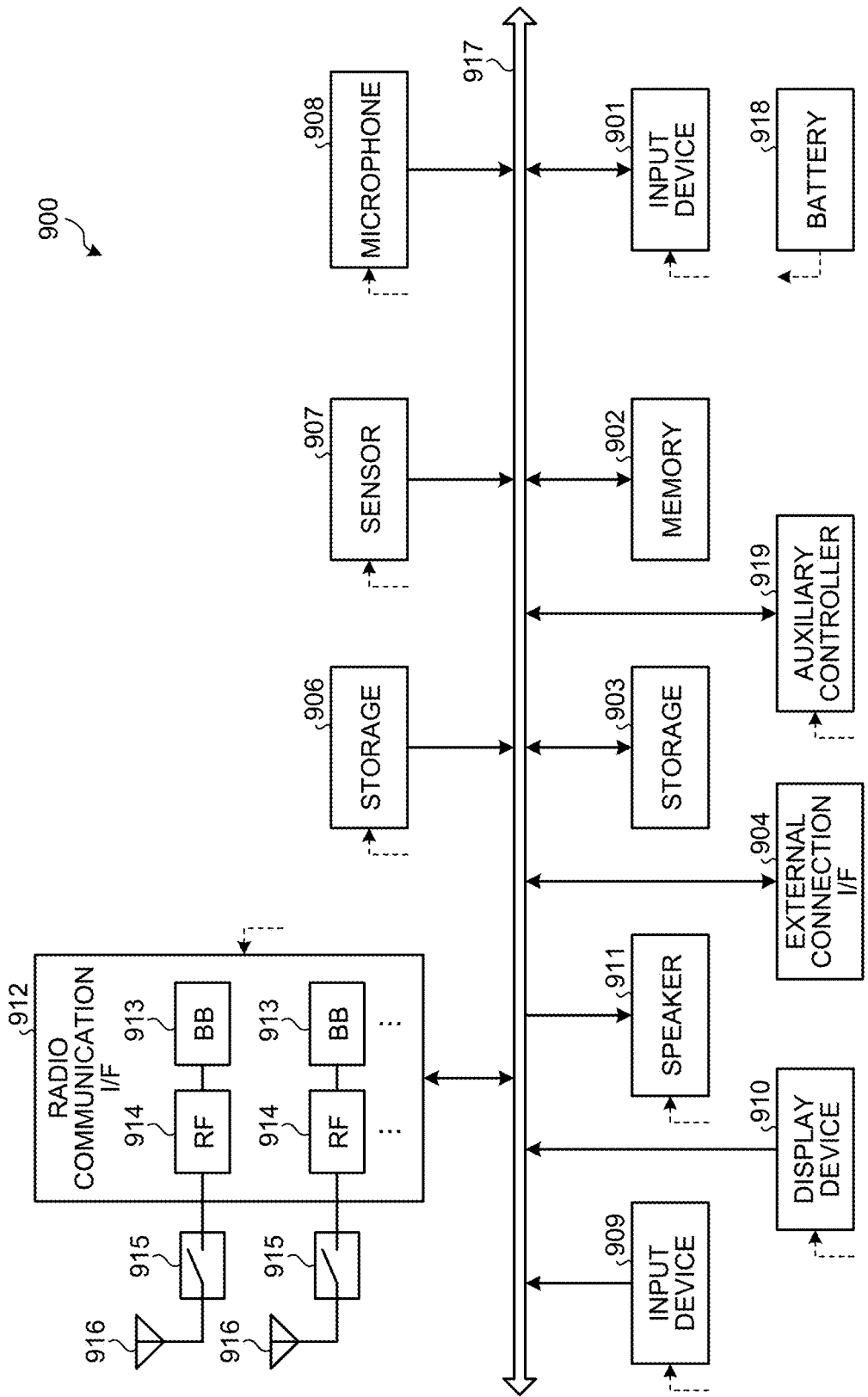
FIG. 21 is a block diagram illustrating an example of a schematic configuration of a smartphone to which the technology according to the present disclosure is applicable.

FIG. 21 is a block diagram illustrating an example of a schematic configuration of a smartphone 900 to which the technology according to the present disclosure is applicable. The smartphone 900 includes a processor 901, memory 902, storage 903, an external connection interface 904, a camera 906, a sensor 907, a microphone 908, an input device 909, a display device 910, a speaker 911, a radio communication interface 912, one or more antenna switches 915, one or more antennas 916, a bus 917, a battery 918, and an auxiliary controller 919.

The processor 901 may be a CPU or a System on Chip (SoC), for example, and controls the functions of the application layer and other layers of the smartphone 900. The memory 902 includes RAM and ROM and stores programs to be executed by the processor 901, and data. The storage 903 may include a storage medium such as semiconductor memory or a hard disk. The external connection interface 904 is an interface for connecting an external device such as a memory card or a Universal Serial Bus (USB) device to the smartphone 900.

The camera 906 includes an imaging element such as a Charge Coupled Device (CCD) or a Complementary Metal Oxide Semiconductor (CMOS), and generates a captured image. Examples of the sensor 907 can include a group of sensors such as a positioning sensor, a gyro sensor, a geomagnetic sensor, and an acceleration sensor. The microphone 908 converts the voice input to the smartphone 900 into a voice signal. The input device 909 includes a touch sensor that detects a touch on the screen of the display device 910, a keypad, a keyboard, a button, or a switch and receives an input of operation or information from the user. The display device 910 has a screen such as a liquid crystal display (LCD) or an organic light emitting diode (OLED) display, and displays an output image of the smartphone 900. The speaker 911 converts the voice signal output from the smartphone 900 into voice.

The radio communication interface 912 supports a cellular communication scheme such as NR, LTE, or LTE-Advanced and executes radio communication. The radio communication interface 912 can typically include a BB processor 913, an RF circuit 914, or the like. The BB processor 913 may perform, for example, encoding/decoding, modulation/demodulation, and multiplexing/demultiplexing, and performs various signal processing for radio communication. The RF circuit 914 may include a mixer, a filter, an amplifier, or the like, and transmits and receives radio signals via the antenna 916. The radio communication interface 912 may be a one-chip module integrating the BB processor 913 and the RF circuit 914. The radio communication interface 912 may include a plurality of BB processors 913 and a plurality of RF circuits 914 as illustrated in FIG. 19. Although FIG. 19 illustrates an example in which the radio communication interface 912 includes a plurality of BB processors 913 and a plurality of RF circuits 914, the radio communication interface 912 may include a single BB processor 913 or a single RF circuit 914.

Furthermore, the radio communication interface 912 may support other types of radio communication scheme such as short-range radio communication scheme, near field radio communication scheme, or wireless Local Area Network (LAN) scheme in addition to the cellular communication scheme. In that case, the radio communication interface 912 may include the BB processor 913 and the RF circuit 914 for each of the radio communication schemes.

Each of the antenna switches 915 switches the connection destination of the antenna 916 between a plurality of circuits included in the radio communication interface 912 (for example, circuits for different radio communication schemes).

Each of the antennas 916 has a single or a plurality of antenna elements (for example, a plurality of antenna elements constituting a MIMO antenna) and is used for transmitting and receiving radio signals by the radio communication interface 912. The smartphone 900 may have a plurality of antennas 916 as illustrated in FIG. 21. Although FIG. 21 illustrates an example in which the smartphone 900 has the plurality of antennas 916, the smartphone 900 may have a single antenna 916.

Furthermore, the smartphone 900 may be provided with the antenna 916 for each of the radio communication schemes. In that case, the antenna switch 915 may be omitted from the configuration of the smartphone 900.

The bus 917 provides mutual connection between the processor 901, the memory 902, the storage 903, the external connection interface 904, the camera 906, the sensor 907, the microphone 908, the input device 909, the display device 910, the speaker 911, the radio communication interface 912, and the auxiliary controller 919. The battery 918 supplies power to individual blocks of the smartphone 900 illustrated in FIG. 21 via the power supply lines partially illustrated by the broken lines in the figure. The auxiliary controller 919 controls operation of minimum necessary functions of the smartphone 900 during a sleep mode, for example.

In the smartphone 900 illustrated in FIG. 21, one or more components included in the control unit 240 described with reference to FIG. 11 may be implemented in the radio communication interface 912. Alternatively, at least some of these components may be implemented in the processor 901 or the auxiliary controller 919. As an example, the smartphone 900 may be equipped with a module including a part (for example, the BB processor 913) or all of the radio communication interface 912, the processor 901, and/or the auxiliary controller 919, and may be equipped with one or more of the above-described components in the module. In this case, the module may store a program for causing the processor to function as the one or more components (in other words, a program for causing the processor to perform the operation of the one or more components) and may execute the program. As another example, the program causing the processor to function as the one or more of the above components may be installed in the smartphone 900, and the radio communication interface 912 (for example, the BB processor 913), the processor 901, and/or the auxiliary controller 919 may execute the program. As described above, the smartphone 900 or the above module may be provided as a device including the one or more components, and a program for causing the processor to function as the one or more components may be provided. Furthermore, a readable recording medium on which the above program is recorded may be provided.

Furthermore, in the smartphone 900 illustrated in FIG. 21, for example, the communication unit 220 described with reference to FIG. 11 may be implemented in the radio communication interface 912 (for example, the RF circuit 914). Furthermore, the antenna unit 210 may be implemented in the antenna 916. Furthermore, the storage unit 230 may be implemented in the memory 902.

Second Application Example

Figure 22:
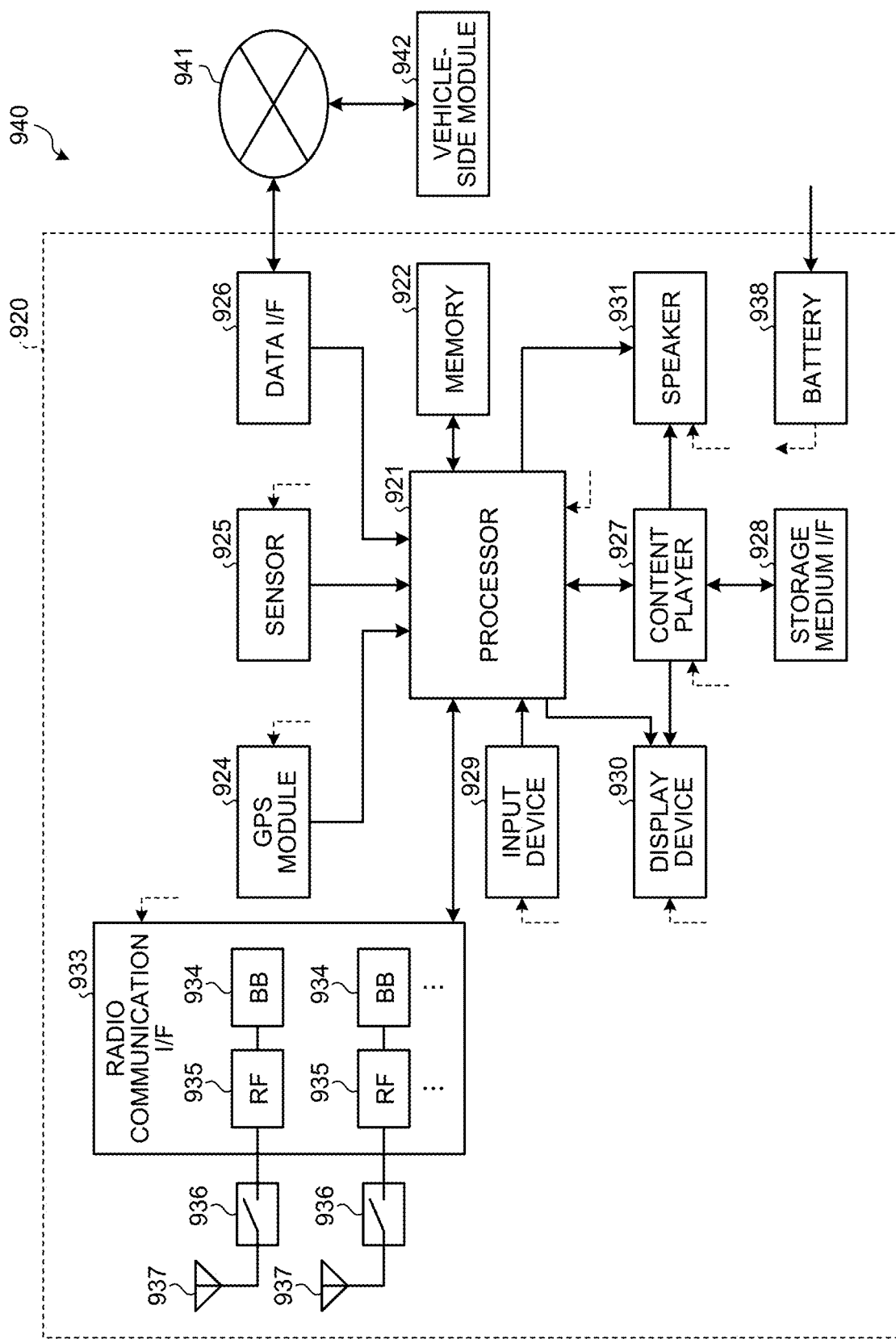
FIG. 22 is a block diagram illustrating an example of a schematic configuration of a car navigator to which the technology according to the present disclosure is applicable.

FIG. 22 is a block diagram illustrating an example of a schematic configuration of a car navigator 920 to which the technology according to the present disclosure is applicable. The car navigator 920 includes a processor 921, memory 922, a Global Positioning System (GPS) module 924, a sensor 925, a data interface 926, a content player 927, a storage medium interface 928, an input device 929, a display device 930, a speaker 931, a radio communication interface 933, one or more antenna switches 936, one or more antennas 937, and a battery 938.

The processor 921 may be a CPU or SoC, for example, and controls the navigation function and other functions of the car navigator 920. The memory 922 includes RAM and ROM and stores programs to be executed by the processor 921, and data.

The GPS module 924 measures the position (including latitude, longitude, and altitude) of the car navigator 920 using GPS signals received from GPS satellites. The sensor 925 can include a group of sensors such as a gyro sensor, a geomagnetic sensor, and a barometric pressure sensor, for example. The data interface 926 is connected to an in-vehicle network 941 via a terminal (not illustrated), for example, and acquires data generated on the vehicle side such as vehicle speed data.

The content player 927 plays pieces of content stored on a storage medium (for example, a CD or DVD) inserted into the storage medium interface 928. The input device 929 includes a touch sensor that detects a touch on the screen of the display device 930, a button, or a switch and receives an input of operation or information from the user. The display device 930 includes a screen such as an LCD or OLED display and displays an image of a navigation function or a content to be played. The speaker 931 outputs the sound of the navigation function or the content to be played.

The radio communication interface 933 supports a cellular communication scheme such as NR, LTE, or LTE-Advanced and executes radio communication. The radio communication interface 933 can typically include a BB processor 934, an RF circuit 935, or the like. The BB processor 934 may perform, for example, encoding/decoding, modulation/demodulation, and multiplexing/demultiplexing, and performs various signal processing for radio communication. The RF circuit 935 may include a mixer, a filter, an amplifier, or the like, and transmits and receives radio signals via the antenna 937. The radio communication interface 933 may be a one-chip module integrating the BB processor 934 and the RF circuit 935. The radio communication interface 933 may include a plurality of BB processors 934 and a plurality of RF circuits 935 as illustrated in FIG. 22. Although FIG. 22 illustrates an example in which the radio communication interface 933 includes a plurality of BB processors 934 and a plurality of RF circuits 935, the radio communication interface 933 may include a single BB processor 934 or a single RF circuit 935.

Furthermore, the radio communication interface 933 may support other types of radio communication schemes such as short-range radio communication scheme, near field radio communication scheme, or a wireless LAN scheme in addition to the cellular communication scheme. In that case, the radio communication interface 933 may include the BB processor 934 and the RF circuit 935 for each of the radio communication schemes.

Each of the antenna switches 936 switches the connection destination of the antenna 937 between a plurality of circuits included in the radio communication interface 933 (for example, circuits for different radio communication schemes).

Each of the antennas 937 has a single or a plurality of antenna elements (for example, a plurality of antenna elements constituting a MIMO antenna) and is used for transmitting and receiving radio signals by the radio communication interface 933. The car navigator 920 may have a plurality of antennas 937 as illustrated in FIG. 22. Although FIG. 22 illustrates an example in which the car navigator 920 has a plurality of antennas 937, the car navigator 920 may have a single antenna 937.

Furthermore, the car navigator 920 may include the antenna 937 for each of the radio communication schemes. In that case, the antenna switch 936 may be omitted from the configuration of the car navigator 920.

The battery 938 supplies power to individual blocks of the car navigator 920 illustrated in FIG. 20 via the power supply lines partially illustrated by the broken lines in the figure. In addition, the battery 938 stores electric power supplied from the vehicle side.

In the car navigator 920 illustrated in FIG. 22, one or more components included in the control unit 240 described with reference to FIG. 11 may be implemented in the radio communication interface 933. Alternatively, at least some of these components may be implemented in the processor 921. As an example, the car navigator 920 may be equipped with a module including a part (for example, the BB processor 934) or all of the radio communication interface 933 and/or the processor 921, and the module may be equipped with one or more of the above components. In this case, the module may store a program for causing the processor to function as the one or more components (in other words, a program for causing the processor to perform the operation of the one or more components) and may execute the program. As another example, a program causing the processor to function as one or more of the above components may be installed in the car navigator 920, and the radio communication interface 933 (for example, the BB processor 934) and/or the processor 921 may execute the program. As described above, the car navigator 920 or the above module may be provided as a device including the one or more components, and a program for causing the processor to function as the one or more components may be provided. Furthermore, a readable recording medium on which the above program is recorded may be provided.

Furthermore, in the car navigator 920 illustrated in FIG. 22, the communication unit 220 described with reference to FIG. 11, for example, may be implemented in the radio communication interface 933 (for example, the RF circuit 935). Furthermore, the antenna unit 210 may be implemented in the antenna 937. Furthermore, the storage unit 230 may be implemented in the memory 922.

Furthermore, the technology according to the present disclosure may be actualized as an in-vehicle system (or vehicle) 940 including one or more blocks of the car navigator 920 described above, the in-vehicle network 941, and a vehicle-side module 942. The vehicle-side module 942 generates vehicle-side data such as vehicle speed, engine speed, or failure information, and outputs the generated data to the in-vehicle network 941.

5. Modifications

A control device that controls the base station device 100 or the terminal device 200 of the present embodiment may be actualized by a dedicated computer system or a general-purpose computer system.

For example, a communication program for executing the above-described operations (for example, a transmission/reception process) is stored in a computer-readable recording medium such as an optical disk, semiconductor memory, a magnetic tape, or a flexible disk and distributed. For example, the program is installed on a computer and the above processes are executed to achieve the configuration of the control device. At this time, the control device may be a base station device or a device external to the terminal device (for example, a personal computer). Furthermore, the control device may be a base station device or a device inside the terminal device.

Furthermore, the communication program may be stored in a disk device included in a server device on a network such as the Internet so as to be downloadable to a computer, for example. Furthermore, the functions described above may be implemented by using operating system (OS) and application software in cooperation. In this case, the sections other than the OS may be stored in a medium for distribution, or the sections other than the OS may be stored in a server device so as to be downloadable to a computer, for example.

Furthermore, among individual processes described in the above embodiments (including modifications, application examples, and examples of application), all or a part of the processes described as being performed automatically may be manually performed, or the processes described as being performed manually can be performed automatically by known methods. In addition, the processing procedures, specific names, and information including various data and parameters illustrated in the above documents or drawings can be arbitrarily changed unless otherwise specified. For example, various types of information illustrated in each of drawings are not limited to the information illustrated.

In addition, each of components of each of devices illustrated is provided as a functional and conceptual illustration and thus does not necessarily need to be physically configured as illustrated. That is, the specific form of distribution/integration of each of devices is not limited to those illustrated in the drawings, and all or a part thereof may be functionally or physically distributed or integrated into arbitrary units according to various loads and use conditions.

Furthermore, the above-described embodiments (including modifications, application examples, and examples of application) can be appropriately combined within a range implementable without contradiction of processes. Furthermore, the order of individual steps illustrated in the flowchart and the sequence diagram in the embodiment can be changed as appropriate.

Although the above-described embodiment (including modifications, application examples, and examples of application), defaults of combinations of the receiving antenna panel and the receiving beam (reception environment) to be used by the terminal device 200 has been described, the "receiving antenna panel" does not have to be explicitly considered in one aspect. As an example, when one receiving beam has been received and measured by a plurality of different receiving antenna panels, it may be recognized (considered) as a plurality of different receiving beams from the viewpoint (UE perspective) of the UE (terminal device 200). In this case, the above-described "defaults of the combinations (reception environment) of the receiving antenna panel and the receiving beam to be used by the terminal device 200" may be replaced with "the defaults of the receiving beam to be used by the terminal device 200". Moreover, the antenna panel in the above embodiment (including modifications, application examples, and examples of application) may correspond to a combination of one or a plurality of antenna ports. In addition to or in place of this, the antenna panel in the above embodiment (including modifications, application examples, and examples of application) may correspond to an antenna port group including one or more antenna ports. In addition to or instead of this, the antenna panel in the above embodiments may correspond to a combination of one or more antenna ports (or an antenna port group) and Quasi-co-location parameters.

In addition to or instead of this, the association between the resource area of the control information (e.g. PDCCH) and the identification information (e.g. SSB-Index) (or the combination of the receiving antenna panel and the receiving beam) described above may be set for per the terminal device 200 (UE), MAC entity in the UE, cell, CC, or BWP.

The resource area may be one or more of a Resource Element Group (REG) constituted with one Resource Block and one OFDM symbol, for example. Alternatively, the resource area may be a Control Channel Element (CCE) constituted with a plurality of (e.g. six) REGs. Further alternatively, the resource area may be a Control-resource set (CORESET) constituted with a plurality of Resource Blocks and one to three OFDM symbols. At least one of the parameters and L values illustrated in Table 2 below constituting CORESET may be transmitted from NGRAN (base station 100) to the UE (terminal device 200) by RRC signaling (e.g. RRC Reconfiguration message). The RRC Reconfiguration message here may also include a MeasConfig (measurement setting) for measuring the reference signal (e.g. SSB) described above.

TABLE 2

| Parameter |
| --- |
| $N_{RB}^{CORESET}$ |
| $N_{symb}^{CORESET}$ |
| $N_{REG}^{CORESET}$ |

6. Summary

As described above, according to one embodiment of the present disclosure, the communication device (for example, the terminal device 200) according to the present embodiment includes the determination unit 241 and the selection unit 242. The determination unit 241 (determination unit) acquires (determines) a plurality of time offset values for determining the reception environment for the user data scheduled by the control information transmitted from the base station 100. The selection unit 242 selects a time offset value for determining the user data reception environment from among the plurality of time offset values based on the control information received from the base station 100.

With this configuration, by switching a plurality of time offset values, it is possible to set an appropriate time offset value according to the situation.

Furthermore, the determination unit 241 (determination unit) of the communication device according to the embodiment acquires (determines) a plurality of time offset values including a first time offset value when the reception environments for the control information and the user data are the same, and a second time offset value when the reception environments for the control information and the user data are different. The selection unit 242 selects one of the first time offset value or the second time offset value based on the control information.

This makes it possible, when receiving PDCCH and PDSCH, to set appropriate time offset values depending on whether the receiving antenna panel is switched, for example, leading to an increased possibility of receiving the PDSCH in the reception environment designated by the PDCCH.

Furthermore, the determination unit 241 (determination unit) of the communication device according to the embodiment acquires (determines) control information including environment information indicating whether the reception environment for the user data is the same as that for the control information. The selection unit 242 selects one of the first time offset value or the second time offset value based on the environment information in the control information.

This makes it possible to determine which time offset value is to be used on the terminal device 200 side, leading to an increased possibility of receiving the PDSCH in the reception environment designated by the base station 100.

Furthermore, when the control information has been received in a preset reception environment, the selection unit 242 of the communication device according to the embodiment selects the third time offset value other than the first time offset value and the second time offset value.

This eliminates the necessity for the terminal device 200 to perform the determination process of whether the reception environments of the PDCCH and the PDSCH are the same, for example, making it possible to simplify the operation of the terminal device 200 and reduce the processing load.

Furthermore, the determination unit 241 (determination unit) of the communication device according to the embodiment acquires (determines) the first time offset value when there is no overlapping in the reception environments for the plurality of pieces of user data designated by each of the plurality of pieces of control information, as well as the second time offset value when there is overlapping. The selection unit 242 selects one of the first time offset value or the second time offset value based on the control information.

With this configuration, the time offset value can be changed depending on whether a plurality of PDSCHs overlaps each other. This makes it possible to correctly estimate the load associated with the switching of the reception environment on the terminal device 200 side, leading to accurate determination of whether the switching will be made in time.

Furthermore, the determination unit 241 (determination unit) of the communication device according to the embodiment acquires (determines) control information including overlap information indicating whether there is overlapping in the reception environments for a plurality of pieces of user data. The selection unit 242 selects one of the first time offset value or the second time offset value based on the overlap information in the control information.

This makes it possible to determine which time offset value is to be used on the terminal device 200 side, leading to an increased possibility of receiving the PDSCH in the reception environment designated by the base station 100.

Furthermore, the determination unit 241 of the communication device according to the embodiment acquires the second time offset value longer than the first time offset value.

This increases the possibility of receiving the PDSCH in the reception environment designated by the PDCCH because the second time offset value is set longer even when the receiving antenna panel is to be switched to receive the PDSCH. Furthermore, even when a plurality of PDSCHs overlaps each other, since the second time offset value is set to be long, it is possible to increase the possibility that the PDSCH can be received in the reception environment designated by the PDCCH.

Furthermore, the communication device according to the embodiment includes the setting unit 243 that sets a user data reception environment based on the time offset value selected by the selection unit 242.

This enables the terminal device 200 to increase the possibility of receiving the PDSCH in the reception environment designated by the PDCCH.

Furthermore, when the time interval between the control information and the user data is less than the time offset value, the setting unit 243 of the communication device according to the embodiment sets the user data reception environment to a preset reception environment.

With this configuration, the PDSCH can be received in the default reception environment even when the reception environment setting designated by the PDCCH is not made in time on the terminal device 200 side.

Furthermore, the setting unit 243 of the communication device according to the embodiment sets the reception environment at the time of reception of the control information, as the reception environment set in advance.

This makes it possible to reduce the possibility of occurrence of a processing failure as compared with the case of using the default of the preset reception environment. That is, it is possible to increase the possibility of receiving the PDSCH.

Furthermore, when the time interval between the control information and the user data is the time offset value or more, the setting unit 243 of the communication device according to the embodiment sets the user data reception environment to the reception environment designated by the control information.

With this setting, PDSCH can be received in the reception environment designated by the PDCCH, making it possible to receive the PDSCH with high accuracy.

Furthermore, the base station device 100 according to the embodiment includes the notification unit 141 and the designation unit 142. The notification unit 141 notifies the terminal device 200 of a plurality of time offset values for determining the user data reception environment designated by the control information transmitted to the terminal device 200. When transmitting control information, the designation unit 142 designates a time offset value for determining the user data reception environment from among a plurality of time offset values.

With this configuration, by switching a plurality of time offset values by the terminal device 200, it is possible to set an appropriate time offset value according to the situation.

The embodiments of the present disclosure have been described above. However, the technical scope of the present disclosure is not limited to the above-described embodiments, and various modifications can be made without departing from the scope of the present disclosure. Moreover, it is allowable to combine the components across different embodiments and modifications as appropriate.

The effects described in individual embodiments of the present specification are merely examples, and thus, there may be other effects, not limited to the exemplified effects.

Note that the present technology can also have the following configurations.

(1)

A communication device comprising:

a determination unit that determines a plurality of time offset values for determining a combination of a receiving antenna panel and a receiving beam for user data scheduled by control information transmitted from a base station; and a selection unit that selects the time offset value for determining the combination of the receiving antenna panel and the receiving beam for the user data from among the plurality of time offset values based on the control information received from the base station.

(2)

The communication device according to (1), wherein the determination unit determines the plurality of time offset values including a first the time offset value for a case where the combinations of the receiving antenna panel and the receiving beam are the same for the control information and the user data, and a second the time offset value for a case where the combinations of the receiving antenna panel and the receiving beam are different for the control information and the user data, and the selection unit selects one of the first time offset value or the second time offset value based on the control information.

(3)

The communication device according to (2), wherein the determination unit determines the control information including environment information indicating whether the combination of the receiving antenna panel and the receiving beam for the user data is the same as the combination for the control information, and the selection unit selects one of the first time offset value or the second time offset value based on the environment information in the control information.

(4)

The communication device according to (2), wherein, when the control information has been received by the combination of the receiving antenna panel and the receiving beam set in advance, the selection unit selects a third the time offset value other than the first time offset value and the second time offset value.

(5)

The communication device according to any one of (1) to (4), wherein the determination unit determines a first the time offset value for a case where there is no overlapping in the combinations of the receiving antenna panel and the receiving beam of the plurality of pieces of user data scheduled by each of the plurality of pieces of control information and determines a second the time offset value for a case where there is overlapping in the combinations, and the selection unit selects one of the first time offset value or the second time offset value based on the control information.

(6)

The communication device according to (5), wherein the determination unit determines the control information including overlap information indicating whether there is overlapping in the combinations of the receiving antenna panel and the receiving beam in the plurality of pieces of user data, and the selection unit selects one of the first time offset value or the second time offset value based on the overlap information in the control information.

(7)

The communication device according to any one of (2) to (6), wherein the determination unit determines the second time offset value that is longer than the first time offset value.

(8)

The communication device according to any one of (1) to (7), further comprising a setting unit that sets the combination of the receiving antenna panel and the receiving beam for the user data based on the time offset value selected by the selection unit.

(9)

The communication device according to (8), wherein, when a time interval between the control information and the user data is less than the time offset value, the setting unit sets the combination of the receiving antenna panel and the receiving beam for the user data to a preset combination of the receiving antenna panel and the receiving beam.

(10)

The communication device according to (9), wherein the setting unit sets the combination of the receiving antenna panel and the receiving beam used at the reception of the control information, as the preset combination of the receiving antenna panel and the receiving beam.

(11)

The communication device according to any one of (9) to (10), wherein, when a time interval between the control information and the user data is the time offset value or more, the setting unit sets the combination of the receiving antenna panel and the receiving beam for the user data to the combination of the receiving antenna panel and the receiving beam designated by the control information.

(12)

A base station device comprising:

a notification unit that notifies a communication device of a plurality of time offset values for determining a combination of a receiving antenna panel and a receiving beam for user data scheduled by control information to be transmitted to the communication device; and a designation unit that designates, at the time of transmission of the control information, the time offset value for determining the combination of the receiving antenna panel and the receiving beam for the user data from among the plurality of time offset values.

(13)

A communication method comprising:

a determination step of determining a plurality of time offset values for determining a combination of a receiving antenna panel and a receiving beam for user data scheduled by control information transmitted from a base station; and a selection step of selecting the time offset value for determining the combination of the receiving antenna panel and the receiving beam of the user data from among the plurality of time offset values based on the control information received from the base station.

(14)

A base station device control method comprising:

a notification step of notifying a communication device of a plurality of time offset values for determining a combination of a receiving antenna panel and a receiving beam for user data scheduled by control information to be transmitted to the communication device; and a designation step of designating, at the time of transmission of the control information, the time offset value for determining the combination of the receiving antenna panel and the receiving beam for the user data from among the plurality of time offset values.

REFERENCE SIGNS LIST

1 COMMUNICATION SYSTEM
100 BASE STATION DEVICE (BASE STATION)
200 TERMINAL DEVICE

The invention claimed is:

1. A communication device comprising:
a control circuit that:
acquires, from a base station:
a plurality of time offset values;
information indicating a combination of a receiving antenna panel and a receiving beam to be used by the communication device for receiving control information that is to be transmitted from the base station;
the control information via the combination of the receiving antenna panel and the receiving beam for the control information
wherein the control information:
identifies a combination of a receiving antenna panel and a receiving beam to be used by the communication device for receiving user data that is to be transmitted from the base station, and
sets a time offset of the plurality of time offset values by the communication device to be used for receiving the user data; and
the user data,
wherein the user data is acquired based a time offset value that is set by the control information from among the plurality of time offset values based on a time interval between the acquisition of the control information and the acquisition of the user data,
wherein, based on the time interval being less than the time offset value set by the control information, the control circuit sets the combination of the receiving antenna panel and the receiving beam for the user data to a preset combination of the receiving antenna panel and the receiving beam for the user data, and
wherein, based on the time interval being equal to or greater than the time offset value set by the control information, the control circuit sets the combination of the receiving antenna panel and the receiving beam for the user data to the combination of the receiving antenna panel and the receiving beam designated by the control information.

2. The communication device according to claim 1, wherein the plurality of time offset values includes:
a first time offset value for a case where the combination of the receiving antenna panel and the receiving beam for the user data is the same as the combination of the receiving antenna panel and the receiving beam for the control information, and
a second time offset value for a case where the combination of the receiving antenna panel and the receiving beam for the user data is different from the combination of the receiving antenna panel and the receiving beam for the control information, and
the control circuit selects one of the first time offset value or the second time offset value based on the control information.

3. The communication device according to claim 2, wherein, based on the control information being received by a combination of the receiving antenna panel and the receiving beam that has been set in advance, the control circuit selects a third time offset value other than the first time offset value and the second time offset value.

4. The communication device according to claim 1, wherein the combination of a receiving antenna panel and a receiving beam to be used by the communication device for receiving user data that is identified by the control information includes:
a first combination of the receiving antenna panel and the receiving beam for a first piece of a plurality of pieces of the user data that is scheduled by a first piece of the control data, and
a second combination of the receiving antenna panel and the receiving beam for a second piece of the plurality of pieces of the user data that is scheduled by a second piece of the control data,
wherein the plurality of time offset values includes:
a first time offset value for a case where there is no overlapping in the first and second combinations of the receiving antenna panel and the receiving beam, and
a second time offset value for a case where there is overlapping in the first and second combinations of the receiving antenna panel and the receiving beam, and
the control circuit selects one of the first time offset value or the second time offset value based on the control information.

5. The communication device according to claim 4, wherein the control information includes overlap information indicating whether there is overlapping in the first and second combinations of the receiving antenna panel and the receiving beam in the plurality of pieces of user data, and
the control circuit selects one of the first time offset value or the second time offset value based on the overlap information in the control information.

6. The communication device according to claim 2, wherein the second time offset value is longer than the first time offset value.

7. The communication device according to claim 1, wherein the control circuit sets the combination of the receiving antenna panel and the receiving beam used at the reception of the control information, as the preset combination of the receiving antenna panel and the receiving beam used at the reception of the user data.

8. A base station device comprising:
a control circuit that notifies a communication device of:
a plurality of time offset values;
information indicating a combination of a receiving antenna panel and a receiving beam to be used by the communication device for receiving control information that is to be transmitted from the base station;
the control information via the combination of the receiving antenna panel and the receiving beam for the control information
wherein the control information:
identifies a combination of a receiving antenna panel and a receiving beam to be used by the communication device for receiving user data that is to be transmitted from the base station, and sets a time offset of the plurality of time offset values by the communication device to be used for receiving the user data; and the user data, wherein the communication device acquires the user data based a time offset value that is set by the control information from among the plurality of time offset values based on a time interval between the acquisition of the control information and the acquisition of the user data, wherein, based on the time interval being less than the time offset value set by the control information, the communication device sets the combination of the receiving antenna panel and the receiving beam for the user data to a preset combination of the receiving antenna panel and the receiving beam for the user data, and wherein, based on the time interval being equal to or greater than the time offset value set by the control information, the communication device sets the combination of the receiving antenna panel and the receiving beam for the user data to the combination of the receiving antenna panel and the receiving beam designated by the control information.

9. A communication method performed by a mobile terminal and comprising:

acquiring, from a base station, a plurality of time offset values;

acquiring, from the base station, information indicating a combination of a receiving antenna panel and a receiving beam to be used by the communication device for receiving control information that is to be transmitted from the base station;

acquiring, from the base station, the control information via the combination of the receiving antenna panel and the receiving beam for the control information wherein the control information:
identifies a combination of a receiving antenna panel and a receiving beam to be used by the communication device for receiving user data that is to be transmitted from the base station, and
sets a time offset of the plurality of time offset values by the communication device to be used for receiving the user data; and acquiring, from the base station, the user data, wherein the user data is acquired based a time offset value that is set by the control information from among the plurality of time offset values based on a time interval between the acquisition of the control information and the acquisition of the user data, wherein, based on the time interval being less than the time offset value set by the control information, the method further includes setting the combination of the receiving antenna panel and the receiving beam for the user data to a preset combination of the receiving antenna panel and the receiving beam for the user data, and wherein, based on the time interval being equal to or greater than the time offset value set by the control information, the method further includes setting the combination of the receiving antenna panel and the receiving beam for the user data to the combination of the receiving antenna panel and the receiving beam designated by the control information.

10. A control method performed by a base station device and comprising:

notifying a communication device of a plurality of time offset values;

notifying the communication device of information indicating a combination of a receiving antenna panel and a receiving beam to be used by the communication device for receiving control information that is to be transmitted from the base station; and notifying the communication device of the control information via the combination of the receiving antenna panel and the receiving beam for the control information wherein the control information:
identifies a combination of a receiving antenna panel and a receiving beam to be used by the communication device for receiving user data that is to be transmitted from the base station, and
sets a time offset of the plurality of time offset values by the communication device to be used for receiving the user data; and notifying the communication device of the user data, wherein the communication device acquires the user data based a time offset value that is set by the control information from among the plurality of time offset values based on a time interval between the acquisition of the control information and the acquisition of the user data, wherein, based on the time interval being less than the time offset value set by the control information, the communication device sets the combination of the receiving antenna panel and the receiving beam for the user data to a preset combination of the receiving antenna panel and the receiving beam for the user data, and wherein, based on the time interval being equal to or greater than the time offset value set by the control information, the communication device sets the combination of the receiving antenna panel and the receiving beam for the user data to the combination of the receiving antenna panel and the receiving beam designated by the control information.

* * * * *